US012032113B2

(12) United States Patent
Ge et al.

(10) Patent No.: US 12,032,113 B2
(45) Date of Patent: Jul. 9, 2024

(54) THROUGH TUBING CEMENT EVALUATION BASED ON ROTATABLE TRANSMITTER AND COMPUTATIONAL ROTATED RESPONSES

(71) Applicant: Halliburton Energy Services, Inc., Houston, TX (US)

(72) Inventors: Yao Ge, Singapore (SG); Xiang Wu, Singapore (SG); Ruijia Wang, Singapore (SG); Ho Yin Ma, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 303 days.

(21) Appl. No.: 17/646,750

(22) Filed: Jan. 3, 2022

(65) Prior Publication Data
US 2023/0213677 A1 Jul. 6, 2023

(51) Int. Cl.
*G01V 1/46* (2006.01)
*E21B 47/005* (2012.01)
(Continued)

(52) U.S. Cl.
CPC .............. *G01V 1/52* (2013.01); *E21B 47/005* (2020.05); *G01V 1/48* (2013.01)

(58) Field of Classification Search
CPC ...... E21B 47/005; E21B 49/003; E21B 47/14; E21B 49/00; E21B 33/14; E21B 47/095;
(Continued)

(56) References Cited

U.S. PATENT DOCUMENTS 3,583,677 A * 6/1971 Phillips ................. B06B 1/0611
366/127
3,914,603 A * 10/1975 Paap ..................... G01V 5/105
250/269.2
(Continued)

FOREIGN PATENT DOCUMENTS

GB 2592974 9/2021
WO 2019018100 1/2019
(Continued)

OTHER PUBLICATIONS

"U.S. Appl. No. 17/643,259, Non-Final Office Action", dated Jun. 13, 2023, 7 pages.
(Continued)

*Primary Examiner* — Edwin J Toledo-Duran
(74) *Attorney, Agent, or Firm* — DeLizio, Peacock, Lewin & Guerra, LLP

(57) ABSTRACT

In some embodiments, a method includes conveying a downhole tool in a tubing, positioned in a casing which forms an annulus between the casing and a wellbore formed in a subsurface formation, the downhole tool having a rotatable transmitter and a receiver array. The method includes performing the following until an acoustic transmission has been emitted for each of a number of defined azimuthal positions: rotating the rotatable transmitter to one of the number of defined azimuthal positions, emitting the acoustic transmission, and detecting, by the receiver array and without rotation of the downhole tool beyond a rotation threshold, an acoustic response of a number of acoustic responses that is derived from the acoustic transmission. The method further includes computationally rotating, by a processor and after detecting, data of each of the number of acoustic responses in a pre-determined direction to generate a computationally rotated multipole response.

20 Claims, 10 Drawing Sheets

(51) Int. Cl.
*G01V 1/48* (2006.01)
*G01V 1/52* (2006.01)

(58) Field of Classification Search
CPC ........ E21B 47/135; E21B 33/13; E21B 33/12;
E21B 47/0025; E21B 47/085; E21B
2200/22; E21B 47/0224; G01V 1/46;
G01V 1/50; G01V 1/52; G01V 1/44;
G01V 2210/1299; G01V 2210/1429;
G01V 1/001; G01V 1/30; G01V 2200/16;
G01V 1/40; G01V 1/48; C04B 28/02;
C09K 8/473; G01N 29/12
See application file for complete search history.

(56) References Cited

U.S. PATENT DOCUMENTS

| | | | | |
|---|---|---|---|---|
| 4,207,961 A * | 6/1980 | Kitsunezaki | ........... | G01V 1/053 181/402 |
| 4,383,591 A * | 5/1983 | Ogura | ........... | G01V 1/52 367/75 |
| 4,649,525 A * | 3/1987 | Angona | ........... | G01V 1/52 367/75 |
| 4,709,357 A * | 11/1987 | Maki, Jr. | ........... | E21B 47/005 367/45 |
| 4,709,362 A * | 11/1987 | Cole | ........... | G01V 1/153 367/189 |
| 4,713,968 A * | 12/1987 | Yale | ........... | G01H 1/04 73/594 |
| 4,783,769 A * | 11/1988 | Holzhausen | ........... | G01V 1/50 367/35 |
| 4,832,148 A * | 5/1989 | Becker | ........... | G01V 1/46 181/104 |
| 4,862,990 A * | 9/1989 | Cole | ........... | G01V 1/135 181/119 |
| 4,874,061 A * | 10/1989 | Cole | ........... | G01V 1/153 181/106 |
| 4,896,303 A * | 1/1990 | Leslie | ........... | G01V 1/50 702/6 |
| 4,951,267 A * | 8/1990 | Chang | ........... | G01V 1/44 73/152.16 |
| 5,010,527 A * | 4/1991 | Mahrer | ........... | E21B 49/00 166/254.2 |
| 5,036,496 A * | 7/1991 | Rutledge | ........... | G01V 1/50 181/105 |
| 5,036,945 A * | 8/1991 | Hoyle | ........... | G01V 1/52 181/102 |
| 5,080,189 A * | 1/1992 | Cole | ........... | G01V 1/145 367/75 |
| 5,135,072 A * | 8/1992 | Meynier | ........... | G01V 1/52 367/75 |
| 5,159,578 A * | 10/1992 | Lenhardt | ........... | E21B 47/0224 181/103 |
| 5,166,909 A * | 11/1992 | Cole | ........... | G01V 1/053 367/75 |
| 5,168,470 A * | 12/1992 | Dennis | ........... | G01V 1/52 181/104 |
| 5,216,638 A * | 6/1993 | Wright | ........... | E21B 47/005 702/6 |
| 5,266,845 A * | 11/1993 | Sakaue | ........... | H03K 19/0008 327/544 |
| 5,357,481 A * | 10/1994 | Lester | ........... | G01V 1/523 367/75 |
| 5,402,392 A * | 3/1995 | Lu | ........... | G01V 1/46 181/102 |
| 5,477,101 A * | 12/1995 | Ounadjela | ........... | G10K 9/121 310/334 |
| 5,544,127 A * | 8/1996 | Winkler | ........... | G01V 1/303 367/27 |
| 5,712,829 A * | 1/1998 | Tang | ........... | G01V 1/44 367/75 |
| 5,763,773 A * | 6/1998 | Birchak | ........... | E21B 47/005 73/152.58 |
| 5,852,262 A * | 12/1998 | Gill | ........... | G01V 1/52 181/102 |
| 5,859,811 A * | 1/1999 | Miller | ........... | G01V 1/48 367/25 |
| 5,881,310 A * | 3/1999 | Airhart | ........... | G01V 3/20 710/3 |
| 5,924,499 A * | 7/1999 | Birchak | ........... | E21B 47/20 175/50 |
| 6,041,861 A * | 3/2000 | Mandal | ........... | E21B 47/005 166/253.1 |
| 6,102,152 A * | 8/2000 | Masino | ........... | G01V 1/52 310/334 |
| 6,176,344 B1 * | 1/2001 | Lester | ........... | G01V 1/48 181/104 |
| 6,188,961 B1 * | 2/2001 | Mandal | ........... | G01V 1/50 702/6 |
| 6,464,439 B1 * | 10/2002 | Janitzki | ........... | F16B 39/30 411/283 |
| 6,567,046 B2 * | 5/2003 | Taylor | ........... | H01L 29/868 343/915 |
| 6,772,067 B2 * | 8/2004 | Blanch | ........... | G01V 1/50 702/14 |
| 6,791,891 B1 * | 9/2004 | Peng | ........... | G11C 29/50 365/201 |
| 6,925,031 B2 * | 8/2005 | Kriegshauser | ........... | G01V 1/48 324/333 |
| 6,930,616 B2 * | 8/2005 | Tang | ........... | G01V 1/44 181/102 |
| 7,302,849 B2 * | 12/2007 | Segal | ........... | G01V 1/44 73/598 |
| 7,471,591 B2 * | 12/2008 | Tello | ........... | G01V 1/44 367/25 |
| 7,681,450 B2 * | 3/2010 | Bolshakov | ........... | E21B 47/005 181/102 |
| 8,270,248 B2 * | 9/2012 | Hurst | ........... | G01V 1/46 367/13 |
| 10,233,748 B2 * | 3/2019 | Kortam | ........... | E21B 49/00 |
| 10,253,615 B2 * | 4/2019 | Hunter | ........... | G01N 29/07 |
| 10,393,903 B2 * | 8/2019 | Jin | ........... | G01V 1/52 |
| 10,705,056 B2 * | 7/2020 | Lei | ........... | E21B 47/005 |
| 10,858,933 B2 * | 12/2020 | Bose | ........... | G01V 1/44 |
| 2004/0119471 A1 * | 6/2004 | Blanz | ........... | G01R 33/62 324/303 |
| 2005/0226098 A1 * | 10/2005 | Engels | ........... | G01V 1/46 367/31 |
| 2006/0233048 A1 * | 10/2006 | Froelich | ........... | E21B 47/005 367/35 |
| 2007/0019506 A1 * | 1/2007 | Mandal | ........... | G01N 29/11 381/113 |
| 2007/0140055 A1 * | 6/2007 | Tello | ........... | G01V 1/44 367/25 |
| 2007/0206439 A1 * | 9/2007 | Barolak | ........... | E21B 47/005 367/35 |
| 2008/0112262 A1 * | 5/2008 | Tang | ........... | G01B 17/02 367/35 |
| 2010/0250214 A1 * | 9/2010 | Prioul | ........... | G01V 1/48 703/2 |
| 2011/0019501 A1 * | 1/2011 | Market | ........... | G01V 1/50 367/34 |
| 2011/0261647 A1 * | 10/2011 | Tabarovsky | ........... | G01V 1/44 367/35 |
| 2012/0176862 A1 * | 7/2012 | D'Angelo | ........... | E21B 47/107 367/35 |
| 2013/0021874 A1 * | 1/2013 | Hartog | ........... | G01V 1/226 367/31 |
| 2013/0289881 A1 * | 10/2013 | Sinha | ........... | G01V 1/306 702/11 |
| 2014/0056111 A1 * | 2/2014 | Vu | ........... | E21B 47/005 367/180 |
| 2015/0107899 A1 * | 4/2015 | Fisher, Jr. | ........... | E21B 44/005 73/152.48 |
| 2015/0134257 A1 * | 5/2015 | Erge | ........... | E21B 49/003 702/9 |
| 2015/0198032 A1 * | 7/2015 | Sinha | ........... | E21B 47/107 166/250.01 |

(56) References Cited

U.S. PATENT DOCUMENTS

| | | | | |
|---|---|---|---|---|
| 2015/0198732 A1* | 7/2015 | Zeroug | ............... | E21B 47/005 367/35 |
| 2015/0218930 A1* | 8/2015 | Zeroug | ............... | E21B 47/005 367/30 |
| 2015/0219780 A1* | 8/2015 | Zeroug | ............... | E21B 49/003 702/6 |
| 2015/0338378 A1* | 11/2015 | Lu | ............... | E21B 47/14 73/152.16 |
| 2015/0378040 A1* | 12/2015 | Mandal | ............... | G01V 1/50 367/35 |
| 2016/0033664 A1* | 2/2016 | Cheng | ............... | E21B 47/107 73/152.57 |
| 2016/0209539 A1* | 7/2016 | Le Calvez | ............... | G01V 1/50 |
| 2017/0058660 A1* | 3/2017 | Hunter | ............... | G01N 29/42 |
| 2017/0168179 A1* | 6/2017 | Lemarenko | ............... | E21B 47/085 |
| 2017/0199295 A1* | 7/2017 | Mandal | ............... | E21B 17/1078 |
| 2018/0031723 A1* | 2/2018 | Przebindowska | ............... | G01V 1/50 |
| 2018/0149019 A1* | 5/2018 | Bose | ............... | E21B 47/005 |
| 2018/0153205 A1* | 6/2018 | Wu | ............... | B33Y 50/02 |
| 2018/0328163 A1* | 11/2018 | Hayman | ............... | E21B 47/005 |
| 2018/0334901 A1* | 11/2018 | Hou | ............... | G01V 1/50 |
| 2019/0018161 A1* | 1/2019 | Wang | ............... | G01V 1/46 |
| 2019/0018162 A1* | 1/2019 | Wang | ............... | G01V 1/48 |
| 2019/0025452 A1* | 1/2019 | Wang | ............... | E21B 49/00 |
| 2019/0129053 A1* | 5/2019 | Wang | ............... | G01V 1/284 |
| 2019/0145241 A1* | 5/2019 | Yao | ............... | E21B 47/002 348/85 |
| 2019/0204468 A1* | 7/2019 | Ge | ............... | G01V 3/34 |
| 2019/0211672 A1* | 7/2019 | Jin | ............... | G01V 1/46 |
| 2019/0293823 A1* | 9/2019 | Sun | ............... | G01V 1/50 |
| 2019/0376380 A1* | 12/2019 | Zhang | ............... | E21B 47/005 |
| 2019/0383130 A1* | 12/2019 | Fox | ............... | G01V 1/40 |
| 2020/0003924 A1* | 1/2020 | Jin | ............... | H10N 30/8554 |
| 2020/0033494 A1* | 1/2020 | Patterson | ............... | E21B 49/00 |
| 2020/0072036 A1* | 3/2020 | Wang | ............... | G01N 29/46 |
| 2020/0088901 A1* | 3/2020 | Quintero | ............... | E21B 47/005 |
| 2020/0116007 A1* | 4/2020 | Mandal | ............... | E21B 47/005 |
| 2020/0116883 A1* | 4/2020 | Padhi | ............... | G01V 1/305 |
| 2020/0116884 A1* | 4/2020 | Weng | ............... | G01V 1/305 |
| 2020/0199995 A1 | 6/2020 | Hu et al. | | |
| 2020/0378247 A1* | 12/2020 | Ma | ............... | E21B 49/00 |
| 2020/0400015 A1 | 12/2020 | Ge et al. | | |
| 2021/0055436 A1 | 2/2021 | Wu et al. | | |
| 2021/0102459 A1 | 4/2021 | Ewe et al. | | |
| 2021/0103069 A1 | 4/2021 | Jin et al. | | |
| 2021/0108510 A1 | 4/2021 | Ge et al. | | |
| 2021/0109241 A1 | 4/2021 | Wang et al. | | |
| 2021/0109243 A1 | 4/2021 | Ge et al. | | |
| 2021/0123339 A1* | 4/2021 | Steel | ............... | G01V 1/46 |
| 2021/0123731 A1 | 4/2021 | Chang et al. | | |
| 2021/0141115 A1 | 5/2021 | Wang et al. | | |
| 2021/0246777 A1 | 8/2021 | Zhao et al. | | |
| 2021/0396126 A1 | 12/2021 | Wang et al. | | |
| 2021/0396900 A1 | 12/2021 | Wang et al. | | |
| 2022/0381133 A1 | 12/2022 | Ge et al. | | |
| 2023/0161063 A1 | 5/2023 | Geerits et al. | | |
| 2023/0175386 A1 | 6/2023 | Ge | | |
| 2023/0194743 A1 | 6/2023 | Wang et al. | | |

FOREIGN PATENT DOCUMENTS

| | | |
|---|---|---|
| WO | 2019240952 | 12/2019 |
| WO | 2020222744 | 11/2020 |
| WO | 2023107136 | 6/2023 |
| WO | 2023121683 | 6/2023 |
| WO | 2023129757 | 7/2023 |

OTHER PUBLICATIONS

"Great Britian Search Report for Application No. 2110237.1", 3 pages, dated Jan. 14, 2022.

Halliburton, "Wireline and Perforating Products and Services Catalog", 448 pages, 2013.

"U.S. Appl. No. 17/643,259, Final Office Action", dated Dec. 28, 2023, 15 pages.

"U.S. Appl. No. 17/643,259, Non-Final Office Action", dated Sep. 11, 2023, 7 pages.

"U.S. Appl. No. 17/645,193, Non-Final Office Action", dated Sep. 27, 2023, 18 pages.

"PCT Application No. PCT/US2021/072826, International Search Report and Written Opinion", dated Aug. 24, 2022, 11 pages.

"PCT Application No. PCT/US2021/073046, International Search Report and Written Opinion", dated Sep. 7, 2022, 11 pages.

"PCT Application No. PCT/US2022/070022, International Search Report and Written Opinion", dated Sep. 21, 2022, 8 pages.

Wang, et al., "The Wavefield of Acoustic Logging in a Cased-hole With a Single Casing—Part I: a Monopole Tool", Geophysical Journal International, vol. 212, Oct. 12, 2017, 15 pages.

"Kuwait Application No. KWP2022000675 First Examination Report Mar. 5, 2024", Mar. 10, 2024, 9 pages.

"U.S. Appl. No. 17/645,193, Final Office Action", Feb. 23, 2024, 17 pages.

* cited by examiner

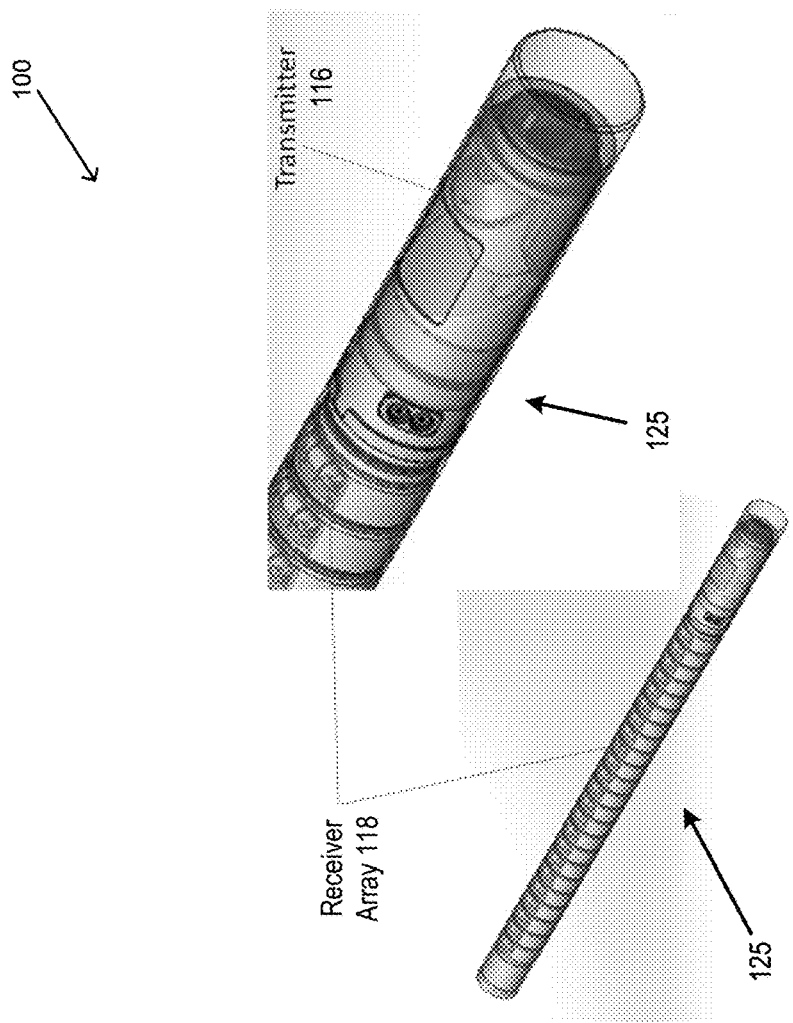
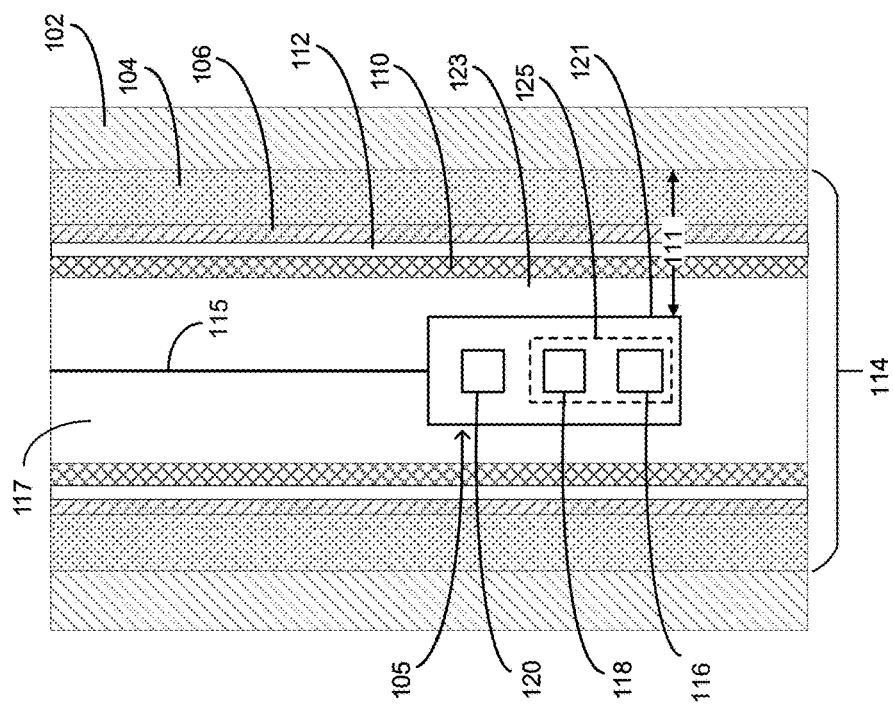
FIG. 1B
FIG. 1A

THROUGH TUBING CEMENT EVALUATION BASED ON ROTATABLE TRANSMITTER AND COMPUTATIONAL ROTATED RESPONSES

TECHNICAL FIELD

The disclosure generally relates to wellbores formed in subsurface formations, and in particular, evaluation of cement bonding conditions in such wellbores.

BACKGROUND

In various acoustic well logging applications (such as anisotropy measurement, formation stress estimation, cement bond evaluation, etc.), a dipole transmitter and receiver can be employed to obtain a dipole response. Sometimes, the dipole transmitter needs to be fired at a specific direction, and the dipole response needs to be measured at a specific direction. However, physically rotating the transmitter and receiver can be challenging.

BRIEF DESCRIPTION OF THE DRAWINGS

Embodiments of the disclosure may be better understood by referencing the accompanying drawings.

FIG. 1A depicts a side cross-sectional view of an example downhole tool having a transmitter and receiver for through tubing cement evaluation (TTCE), according to some embodiments.

FIG. 1B depicts a cross-sectional view of the transmitter of the example downhole tool of FIG. 1A, according to some embodiments.

DESCRIPTION OF EMBODIMENTS

Figure 2:
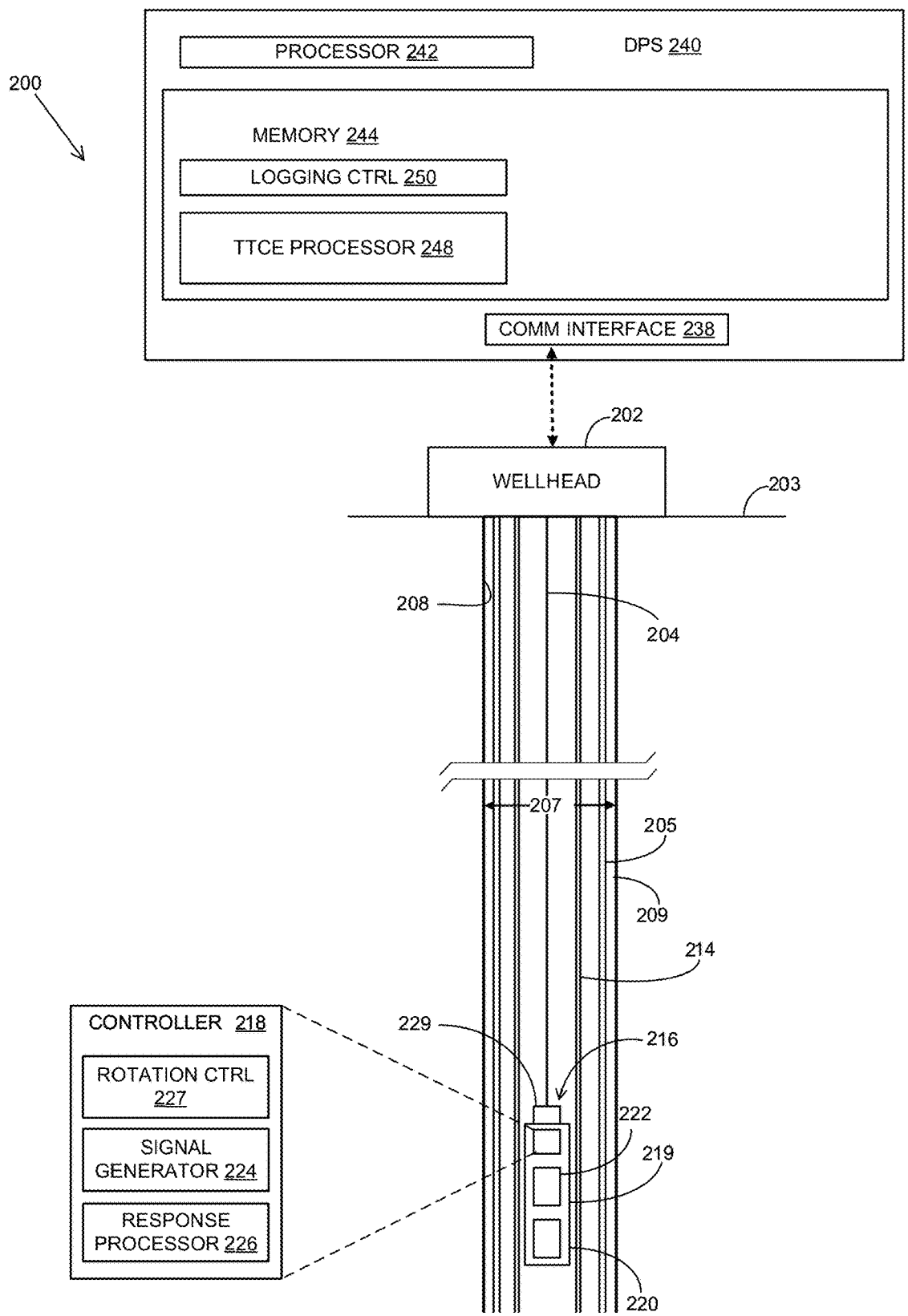
FIG. 2 depicts an example system that is configured to implement through tubing cement evaluation (TTCE), according to some embodiments.

The description that follows includes example systems, methods, techniques, and program flows that embody embodiments of the disclosure. However, it is understood that this disclosure may be practiced without these specific details. For instance, this disclosure refers to through-tubing cement evaluation using an acoustic logging tool comprising a rotatable transmitter, an array of azimuthal receivers, and calculating signal responses in any azimuthal direction regardless of tool position in illustrative examples. Embodiments of this disclosure can be also applied to formation evaluation using an acoustic logging tool comprising a rotatable transmitter, an array of azimuthal receivers, and calculating signal responses in any azimuthal direction regardless of tool position. In other instances, well-known instruction instances, protocols, structures, and techniques have not been shown in detail in order not to obfuscate the description.

Example embodiments can be used for various downhole well logging applications, including through-tubing cement evaluation (TTCE). For instance, example embodiments can include a transmitter and receiver (e.g., dipole) positioned in a wellbore for acoustic well logging (including anisotropy measurement, formation stress estimation, cement bond evaluation, etc.).

Due to the beam pattern of a dipole transmitter and receiver, the dipole response can be mostly directional. In many applications, a dipole transmitter emission and receiver detection need to be at specific azimuthal direction(s). This is often difficult to achieve using mechanical means. Sometimes, the azimuthal direction can only be determined post-processing based on the received signal. Example embodiments can include an equivalent transmitting and receiving dipole signal at any specific direction. Some embodiments can include physically rotating a transmitter while computationally rotating the response. In some embodiments, the response can be computationally rotated such that a fluid channel behind the casing and within the cement is a tool coordinate (e.g., the X coordinate) is approximately in the center of the fluid channel. Some implementations can include a rotating unipole transmitter and an array of azimuthal receivers.

Example TTCE Application

Some embodiments can be used in downhole applications to increase the measurement sensitivity of through tubing cement evaluation (TTCE) and acoustic signals at target points such as at or near a casing, a cement layer, and/or a casing/cement interface. For example, some embodiments can be used in Measurement While Drilling (MWD) and wireline operations, which are further described below. However, example embodiments can be used for other types of applications, such as formation evaluation. An example application for TTCE is now described. In particular, FIG. 1 depicts an example sensor configuration that is part of a through tubing cement evaluation (TTCE) system, according to some embodiments.

FIG. 1A depicts a side cross-sectional view of an example downhole tool having a transmitter and receiver for through tubing cement evaluation, according to some embodiments. FIG. 1B depicts a cross-sectional view of the transmitter of the example downhole tool of FIG. 1A, according to some embodiments.

As shown in FIGS. 1A-1B (collectively, FIG. 1), an acoustic logging tool 105 is deployed within a well that is defined by a wellbore 114 in which a production tubing 110 is installed within cement and casing layers. The acoustic logging tool 105 is generally configured to induce acoustic echo responses and process the responses to determine material and structural properties of multiple material layers within the wellbore 114. For example, the echo responses may comprise reflected and/or refracted acoustic waves generated when acoustic signals transmitted from acoustic logging tool 105 reflect and/or refract at acoustic impedance boundaries within and between the wellbore layers.

The wellbore 114 is formed within a subsurface formation 102, such as may comprise a hydrocarbon formation in part, by drilling, and is typically filled with liquid and/or slurry substances such as water, reservoir fluids, etc. The outer perimeter of the wellbore 114 can be sealed from the subsurface formation 102 by one or more barrier layers. For instance, a casing 106 comprises a metallic tubular member forming an inner liner that seals the interior of the wellbore 114. To securely position the casing 106 with respect to the inner surface of the subsurface formation 102, a cement layer 104 is formed between the casing 106 and the inner surface of the subsurface formation 102 that bounds the wellbore 114. The production tubing 110 is installed within the cylindrical interior space of the casing 106 to form an innermost production conduit 117 and an annular space 112 that typically forms an annular fluid layer between the outer surface of the production tubing 110 and the inner surface of casing 106.

The acoustic logging tool 105 includes a tool housing 121 within which an acoustic sensor 125 and a controller 120 are disposed. As shown in FIG. 1A, the acoustic sensor 125 comprises an acoustic transmitter 116 and an acoustic receiver array 118 within the tool housing 121 within which the controller 120 is also disposed. As further described below, the acoustic transmitter 116 can include one or more transmitters. Similarly, the acoustic receiver 118 can be an array including two or more receivers.

The acoustic logging tool 105 is positioned within the innermost production conduit 117 in the production tubing 110 with an additional annular fluid layer 123 formed in the annular space between the outer surface of the tool housing 121 and the inner surface of the production tubing 110. The acoustic sensor components are movably disposed within the fluid and along the length of the production conduit 117 via a conveyance means 115 such as may be a wireline or slickline. In some embodiments, the acoustic sensor 125 may be configured with the acoustic transmitter 116 and the acoustic receiver 118 being individually contained and independently movable components. Alternatively, the acoustic sensor 125 may be configured within a contiguous sensor housing such as depicted in FIG. 1 in which both the transmitter 116 and the receiver 118 are contained in a common tool housing 121.

The acoustic logging tool 105 comprises acoustic source/transmission components and acoustic detection and processing components within the acoustic sensor 125. The transmitter and receiver components of the acoustic sensor 125 are configured to measure acoustic responses, such as in the form of acoustic echoes, generated from acoustic source signals transmitted from the acoustic transmitter 116 to various acoustic response target points within the wellbore 114. In the depicted embodiment of FIG. 1A, the acoustic sensor 125 comprises the transmitter 116 and at least two receivers of the receiver 118. The at least two receivers of the receiver 118 are azimuthal receivers. In the depicted embodiment of FIG. 1B, the transmitter 116 includes one or more piezoelectric ceramics. The transmitter 116 and receiver 118 are configured as piezoelectric transducers that are electrically, optically, or otherwise communicatively coupled to the controller 120. As shown in FIG. 1B, the transmitter 116 utilizes rectangular piezoelectric ceramics to form two bender bars 130 made of PZT material to induce acoustic transmissions. The bender bars 130 comprised two fixed ends and are each bonded between two piezoelectric patches 131 and 132 which may apply piezoelectric stresses to each of the bender bars. The piezoelectric stresses cause each of the bender bars 130 to bend and effectively vibrate at a frequency of a voltage applied to the piezoelectric patches 131, 132. However, the transmitter 116 is not limited to using rectangular piezoelectric ceramics and may utilize other forms, according to some embodiments. The isolated representation in FIG. 1B of the acoustic sensor 125 includes the transmitter 116, which may be a distinct, axially offset component from the receiver 118, as shown in FIG. 1A.

The controller 120 may be a programmable electronic module that is communicatively coupled to the piezoelectric transducer(s) of the transmitter/receiver components within the acoustic sensor 125. The controller 120 is configured, using electronics and program code instructions, to provide excitation pulse signals to the transmitter 116 during pulse transmit periods that may comprise the excitation phase of measurement cycles. The controller 120 can include a signal generator and a signal processor. The signal generator is configured using any combination of hardware and/or program code constructs to generate and send excitation pulse signals via the transmitter 116. The signal processor is configured using any combination of hardware and/or program code constructs to detect/measure echo response signals received from the receiver 118.

TTCE analysis can include acoustic response information that is location-specific (e.g., along the cylindrical boundary between the cement layer 104 and the casing 106) as well as property-specific (e.g., density, structural characteristics). The multiple different material layers that may present acoustic barriers (reflectors and sinks) and varying ambient environmental conditions may present interference for or otherwise reduce accuracy of the acoustic measurements and particularly acoustic measurements for which the target response locations are outside of one or more of the wellbore tubulars such as the production tubing 110 and the casing 106. The apparatus 100 is configured to collect and process acoustic response information in a manner that removes interference such as extraneous acoustic response information and sensor variations to enable more accurate representation of target acoustic response information. The acoustic measurement components of the apparatus 100 are configured to implement efficient and accurate acoustic measurements of wellbore material properties with reduced reliance on removing internal acoustic barriers such as production tubing.

In some embodiments, the apparatus 100 is configured to collect acoustic measurement information that uses differential processing of acoustic responses to more precisely isolate intended acoustic response information such as cement bond response information. As further described below, the acoustic transmitter 116 can include an azimuthally directional transmitter such as a unipole transmitter that emits substantially unidirectional acoustic pulses. In some other embodiments, the acoustic transmitter 116 can be other types of transmitters (such as a dipole transmitter). Also, as mentioned above and described in further detail below, the acoustic receiver 118 can be a multi-receiver array. For example, the acoustic receiver 118 can be an array of two or more azimuthal receivers.

The target points for acoustic measurements by the directional acoustic transmitter/receiver pair may be included along one or more circumferential boundaries at various radial distances from the center of the wellbore 114. For example, as further described below, target points can include cement-to-casing bond target points that are located outside of both the production tubing 110 and the casing 106.

FIG. 2 depicts an example system that is configured to implement through tubing cement evaluation (TTCE), according to some embodiments. In FIG. 2, a well system 200 is particularly configured to address issues posed by TTCE, which entails measuring acoustic responses, such as acoustic echoes, generated by acoustic source signals that originate within an innermost tubing within a wellbore. The well system 200 includes subsystems, devices, and components configured to implement acoustic measurement testing procedures within a substantially cylindrical wellbore volume 207 that in the depicted embodiment is bounded and sealed by a casing 205. A cement layer 209 between the casing 205 and an inner borehole wall 208 provides a protective seal that maintains structural and positional stability of the casing 205. The well system 200 includes a wellhead 202 configured to deploy drilling and production and/or injection equipment such as drilling strings, production strings, etc. As shown, an interior tubing 214 is deployed within the wellbore volume 207 and may comprise production tubing, drilling tubing such as drill pipes, injection tubing, or other type of tubing.

The wellhead 202 includes components for configuring and controlling deployment in terms of insertion and withdrawal of a test string within the wellbore volume 207. The test string may be configured as a wireline test string deployed within the interior tubing 214 and having a wireline cable 204 for moving and providing communication and power source connectivity for downhole test tools. In the depicted embodiment, the wireline cable 204 is configured as the conveyance means for a logging tool 216 that includes an acoustic transmitter 220 and an acoustic receiver 222 disposed within a tool housing 219. Communication and power source couplings are provided to the acoustic transmitter 220 and the acoustic receiver 222 via the wireline cable 204 having one or more communication and power terminals within the wellhead 202.

The acoustic transmitter 220 and the acoustic receiver 222 comprise components, including components not expressly depicted, configured to implement acoustic measurement testing including TTCE testing. The acoustic receiver 222 may comprise an array of azimuthal receivers with two or more receivers. The logging tool 216 further includes a controller 218 comprising components including a signal generator 224 and a response processor 226 for controlling acoustic measurement operation. The signal generator 224 is configured to generate electrical signals that are converted by the acoustic transmitter 220 into acoustic waves emitted within the wellbore 207. The response processor 226 is configured to measure acoustic responses by processing the converted acoustic wave information from the acoustic receiver 222.

The logging tool 216 is coupled via a telemetry link within the wireline cable 204 to a data processing system (DPS) 240. The DPS 240 includes a communication interface 238 configured to transmit and receive signals to and from the logging tool 216 as well as other devices within well system 200 using a communication channel with the wireline cable 204 as well as other telemetry links such as wireless electromagnetic links, acoustic links, etc. The DPS 240 may be implemented in any of one or more of a variety of standalone or networked computer processing environments. As shown, the DPS 240 may operate above a terrain surface 203 within or proximate to the wellhead 202, for example. The DPS 240 includes processing, memory, and storage components configured to receive and process acoustic measurement information to determine material and structural properties and conditions within and/or external to the cylindrical volume defined by the borehole wall 208. The DPS 240 is configured to receive acoustic response data from the logging tool 216 as well as from other sources such as surface test facilities. The acoustic data received from the logging tool 216 includes echo response signals detected by the acoustic receiver 222. The DPS 240 comprises, in part, a computer processor 242 and a memory device 244 configured to execute program instructions for controlling measurement cycles and processing the resultant echo response signals to determine wellbore material properties. Such properties and structural attributes may include but are not limited to cement structural integrity and the state of adhesion of the bonding between the cement layer 209 and the casing 205.

The DPS 240 includes program components including a TTCE processor 248 and a logging controller 250. The TTCE processor 248 includes program components and data configured to process acoustic response data received from the logging tool 216. The logging controller 250 includes program components and data configured to coordinate and otherwise control positioning and repositioning of the logging tool 216 within and along the length of the interior tubing 214, as well as the acoustic measurement procedures at each position. Loaded from the memory 244, the TTCE processor 248 is configured to execute program instructions to receive and process acoustic response data such as the logging data 230.

The components within the DPS 240 and the test string interoperate to implement acoustic measurement collection and processing in a manner enabling optimal accuracy of through tubing material evaluation. A next acoustic measurement cycle may begin with positioning of the logging tool 216 at a next axial location along the length of interior tubing 214. At the next axial location, the logging tool 216 can rotationally positioned to an initial specified azimuthal angle. In the depicted embodiment, the logging tool 216 may be rotated via controlled actuation of a DC motor 229. For example, a rotation controller 227 may be incorporated within the controller 218 and be configured to azimuthally position the logging tool 216, and more specifically the transmitter/receiver within the logging tool 216, to a specified initial measurement azimuth angle.

The measurement cycle may continue with the logging tool 216 measuring an acoustic response at the initial azimuthal angle. For TTCE logging, the overall acoustic response includes an echo response window in which echo signal characteristics profile material and structural characteristics of the cement-to-casing bonding at the azimuth angle. Following the initial azimuth measurement, the logging tool 216 is rotated to a next azimuth at which a next azimuthally specific acoustic response is measured and otherwise collected, and the process is repeated at other azimuthal angles along a full 360° azimuthal path. The azimuthal angles at which the measurements are performed are selected to result in measurement pairs that are substantially azimuthally offset (e.g., one measurement is separated by at least 90° from the other measurement in the pair). In some embodiments, the measurement angles are selected to result in measurement pairs that are substantially azimuthally opposed (e.g., separated by approximately 180° within a range of 10°). It should be noted that the measurements at each point may be nearly instantaneous due to the proximity of the cement layer target points such that the rotation of the logging tool 216 between measurements may be intermittent or continuous.

Example Transmitter-Receiver Configuration

Figure 3:
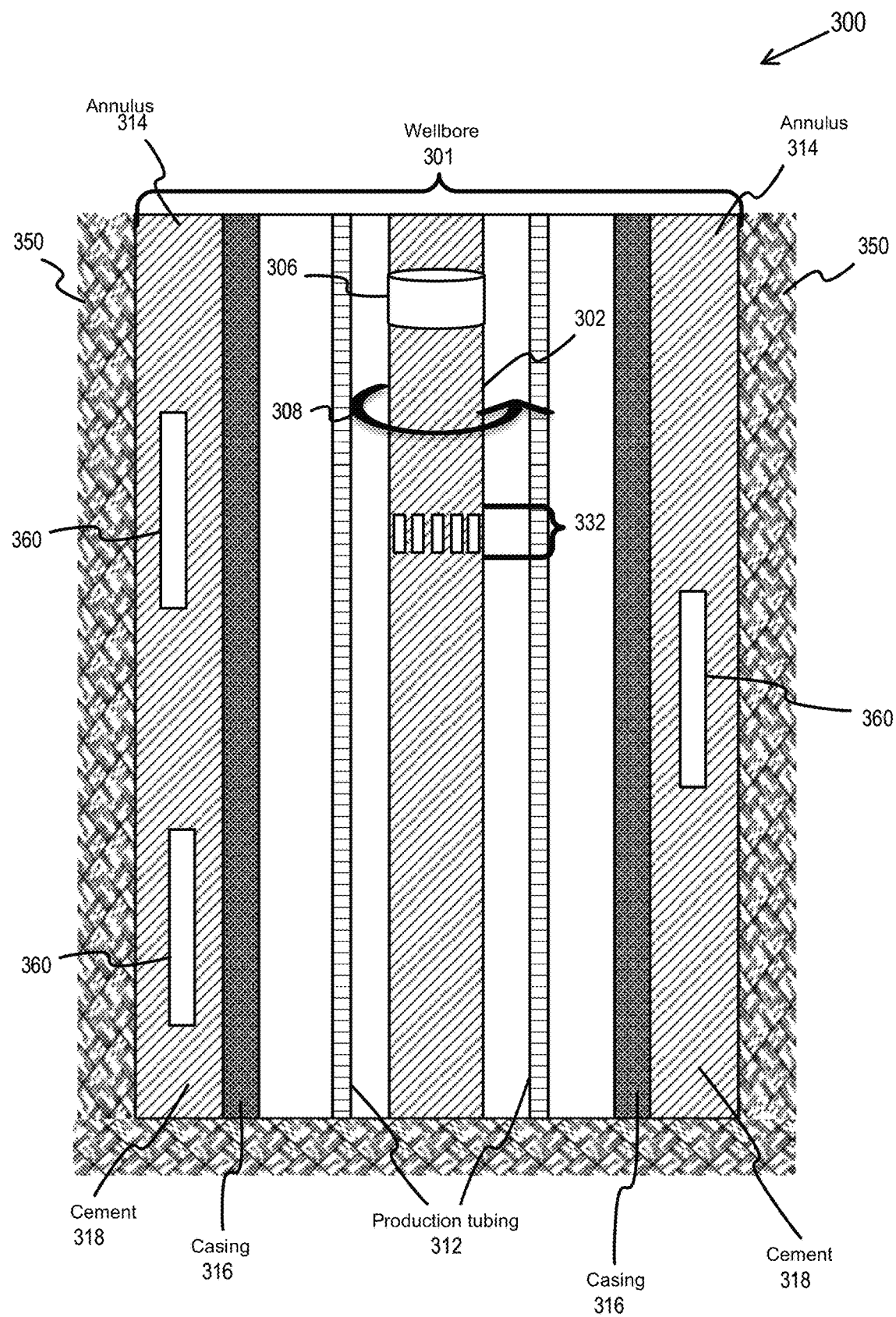
FIG. 3 depicts an acoustic logging tool that includes an example transmitter-receiver configuration, according to some embodiments.

An example transmitter-receiver configuration is now described. FIG. 3 depicts an acoustic logging tool that includes an example transmitter-receiver configuration, according to some embodiments. FIG. 3 also depicts a wellbore 301 formed in a subsurface formation 350 of which the acoustic logging tool is disposed in. The wellbore 301 has been cased (with a casing 316) such that an annulus 314 has been defined between a wall of the wellbore 301 and the casing 316. Cement 318 has been poured into the annulus 314. In this example, the cement 318 includes three channels 360. Thus, these portions of the cement 318 are partially (not fully) bonded. As further described below, example embodiments can evaluate the cement to determine varying bonding conditions of the cement.

A production tubing 312 has been positioned down the wellbore 301 within the casing 316. The acoustic logging tool 302 is positioned within the production tubing 312. In this example, the acoustic logging tool 302 includes a rotatable unipole transmitter 306 that can rotate to emit signals in various azimuthal directions. Additionally, an array of azimuthal receivers 332 is positioned at a different longitudinal position on the acoustic logging tool 302 as compared to the unipole transmitter 306. In this example, the receiver array 332 includes a number of receivers at different azimuthal positions circumferentially around the acoustic logging tool 302. In some implementations, the receiver array 332 can be replaced with an X dipole receiver and a Y dipole receiver to receive a dipole response being emitted from the cross-dipole transmitter. A direction of rotation 308 is shown to portray the acoustic logging tool 302 and its ability to rotate to align a unipole transmitter 306 with an azimuthal direction of interest. In other embodiments, cross-dipole configurations may utilize two dipole transmitters oriented in orthogonal azimuthal directions on the tool from other another.

Figure 4:
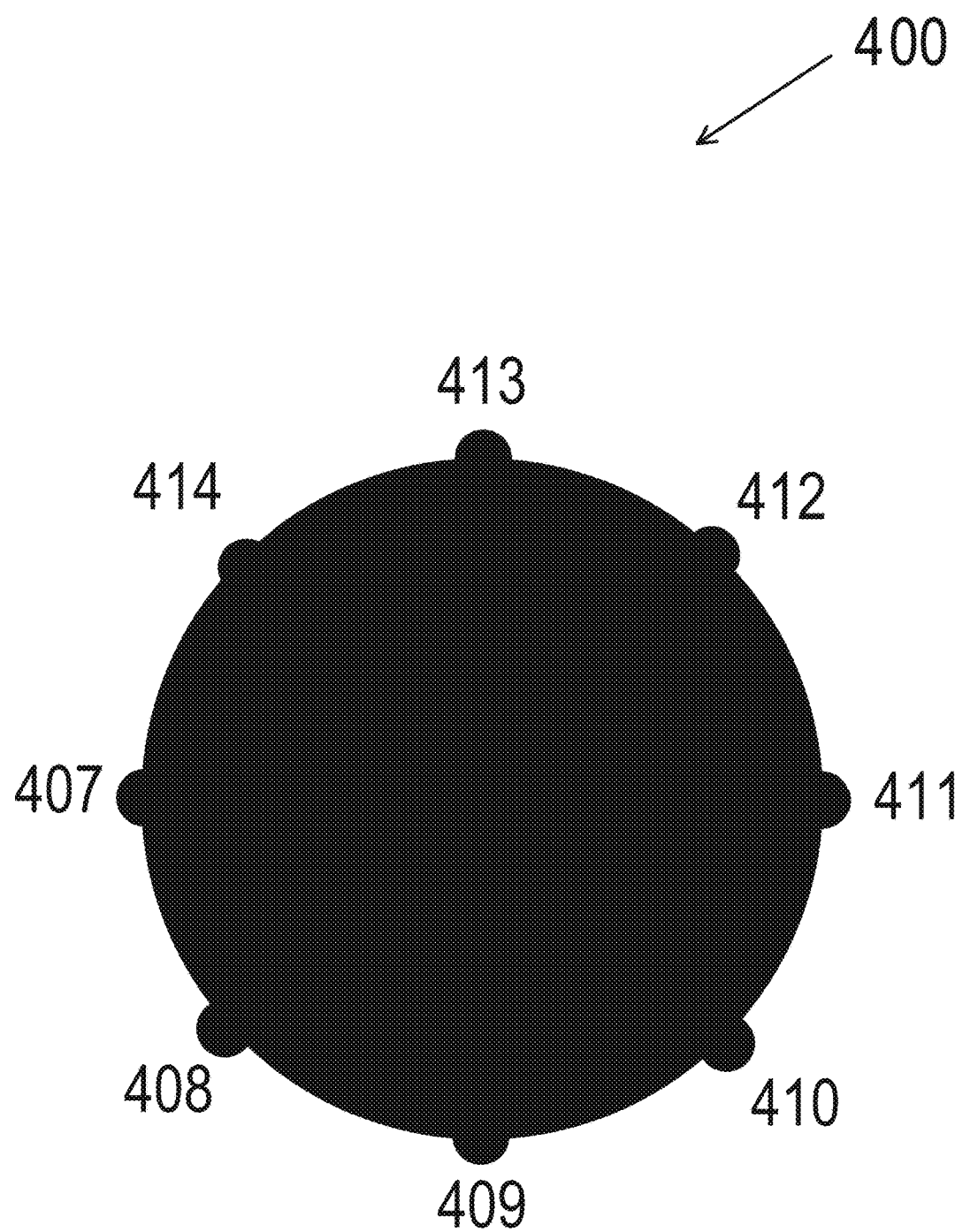
FIG. 4 depicts a cross-sectional view of an array of azimuthal receivers disposed on the acoustic logging tool, according to some embodiments.

FIG. 4 depicts a cross-sectional view of an array of azimuthal receivers disposed on the acoustic logging tool, according to some embodiments. The acoustic logging tool 302 in FIG. 3 only renders five of the transmitters visible, but the receiver cross section 400 comprises the full array of azimuthal receivers 407-414 oriented in various azimuthal directions around the acoustic logging tool 302. In the cross-sectional view of the azimuthal receiver array, eight azimuthal receivers 407-414 are shown. In some embodiments, the array includes at least two azimuthal receivers. A receiver angle, $\varphi_{414}$, is shown which represents the angle to factor into calculations of a decomposed signal response based on an example scenario with the acoustic transmitter at 0 degrees and any receiver at a positive angle $\varphi_{xxx}$ from the axis in which transmitter and/or tool is oriented. In this example, the unipole transmitter 306 is oriented along the axis of azimuthal receiver 411, emits an acoustic transmission in this direction, and a TTCE processor 248 computes the acoustic response received by azimuthal receiver 414.

Figure 5B:
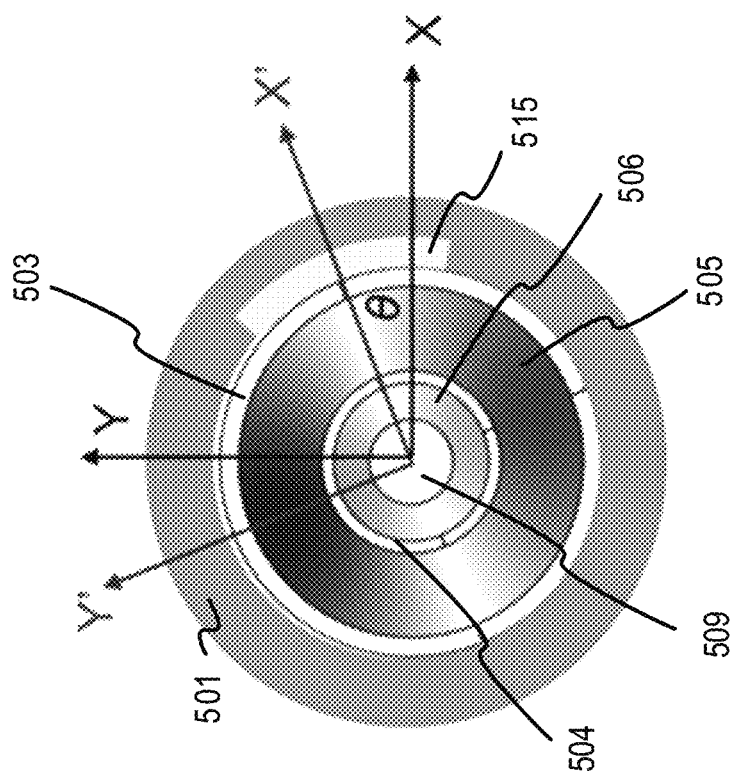
FIGS. 5A-5B depict cross-sectional views of a wellbore that includes a TTCE configuration (having an example acoustic logging tool, tubing, casing, and cement composition) having tool coordinates that are not rotated and rotated, respectively, according to some embodiments.
Figure 5A:
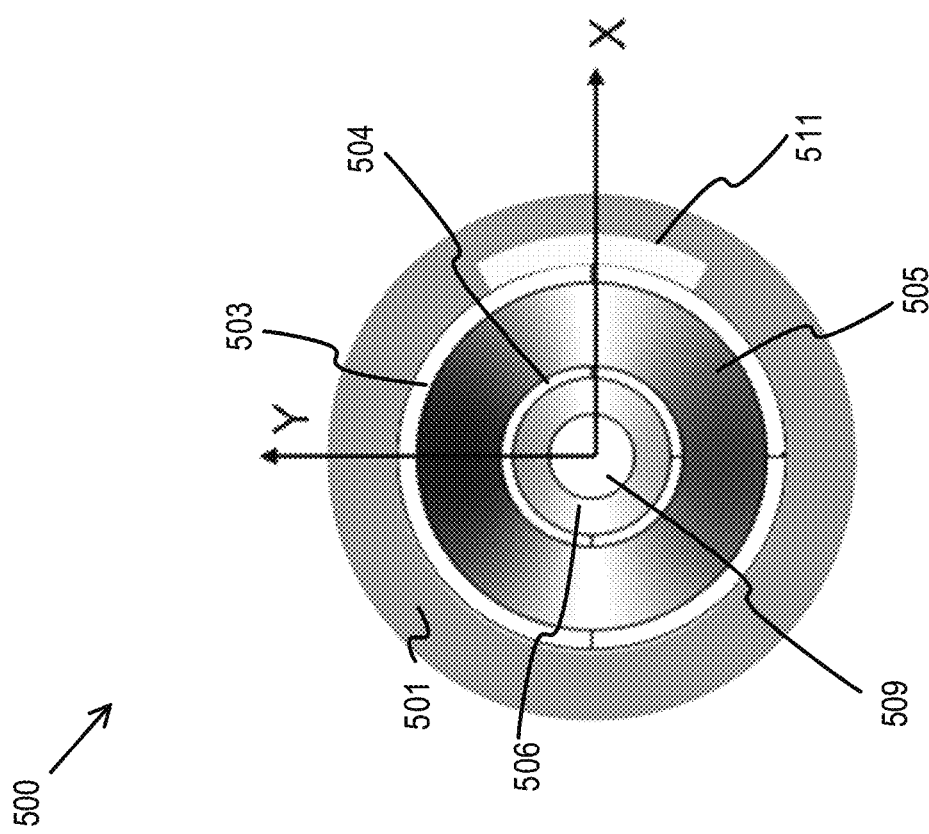

FIG. 5A depicts cross-sectional top view of a wellbore that includes a TTCE configuration (having an example acoustic logging tool, tubing, casing, and cement) having a standard orientation, wherein a Y dipole is transmitted and a fluid channel behind the casing are at approximately 0 degrees, according to some embodiments. FIG. 5B depicts the cross-sectional top view of the wellbore of FIG. 5A having a rotated orientation with rotated coordinates (X'-Y') having a difference of an arbitrary angle, θ, from the tool coordinates (X-Y), according to some embodiments.

FIGS. 5A-5B include a casing 503 that is positioned in a wellbore such that an annulus is defined between a wall of the wellbore and the casing 503. Cement 501 is poured into this annulus. A production tubing 504 is positioned within the casing 503 such that an annulus 505. An acoustic logging tool 509 is positioned within a production tubing 504 such that there is an annulus 506 is defined between the acoustic logging tool 509 and the production tubing 504. An example of the acoustic logging tool 509 can be the acoustic logging tool depicted in FIG. 3.

FIGS. 5A-5B also depict a fluid channel 511 in the cement 501 such that the cement bonding in this area of the cement 501 is considered partially bonded (because of the fluid channel). FIG. 5A also depicts X-Y coordinates that are the coordinates of the acoustic logging tool 509 (the tool coordinates). As shown, the tool coordinates are aligned with the fluid channel 511 such that a coordinate (the X coordinate) is at or near the center of the fluid channel 511. In this example, the Y dipole is transmitted and the fluid channel 511 is at 0° relative to the tool coordinates.

Conversely, FIG. 5B depicts an example where a fluid channel 515 is not aligned with the tool coordinates. In particular, FIG. 5B depicts X'-Y' coordinates that are defined as rotated coordinates in order to align the X'-Y' coordinates with the fluid channel 515. The rotation of the rotated coordinates (X'-Y') are such that a coordinate (the X coordinate) is at or near the center of the fluid channel 515. As shown, an arbitrary angle, θ, is a difference between the rotated coordinates (X'-Y') and the tool coordinates (X-Y). As further described below, this rotation of the acoustic response from the tool coordinates (X-Y) to the rotated coordinates (X'-Y') to align the coordinates with a fluid channel can be performed by computational rotating the response after emission and detection of the acoustic response.

Example Operations

Figure 6:
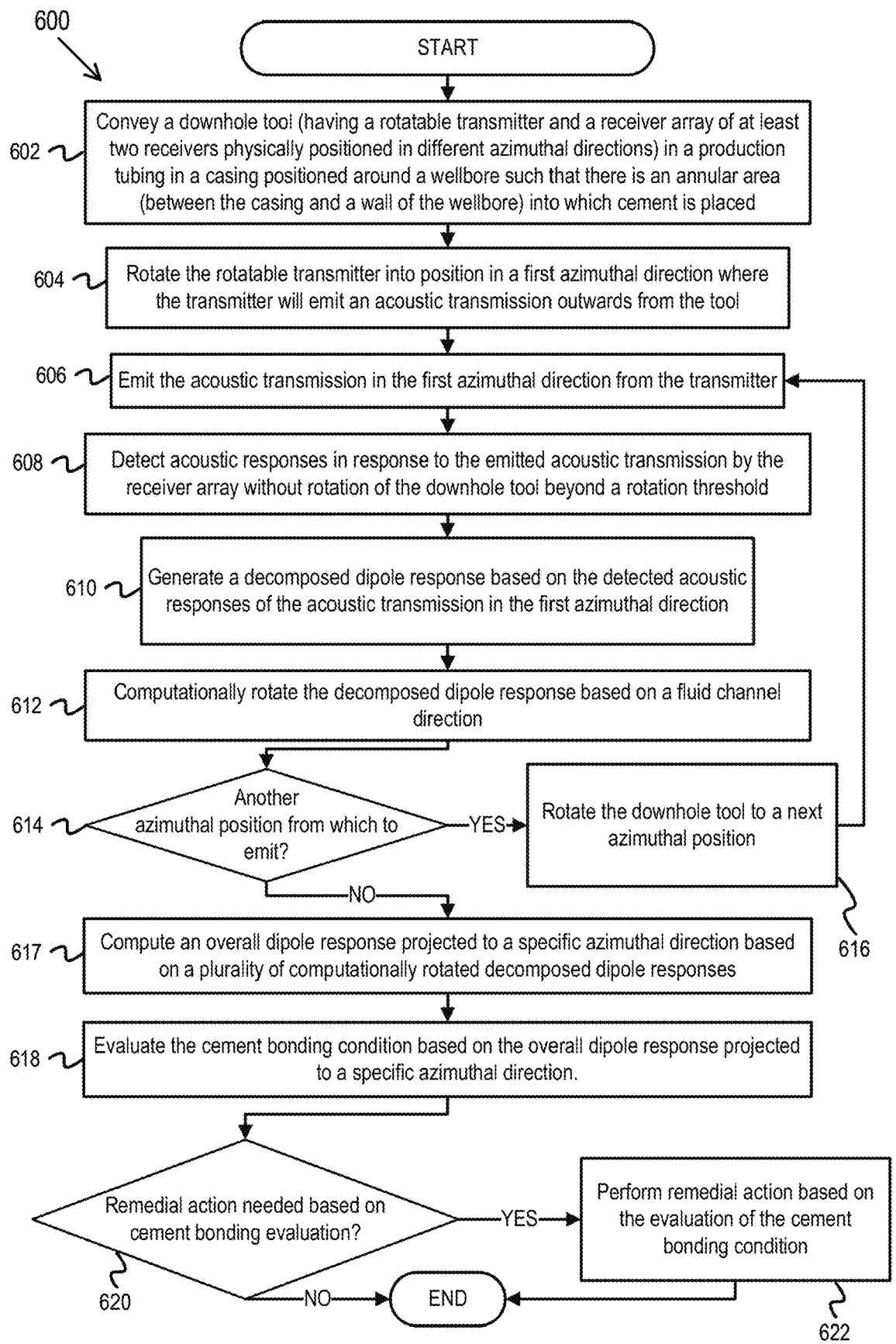
FIG. 6 depicts a flowchart of example operations for through-tubing cement evaluation (TTCE), according to some embodiments.

Example operation of the example transmitter-receiver configuration is now described. FIG. 6 depicts a flowchart of example operations for through-tubing cement evaluation (TTCE), according to some embodiments. Operations of a flowchart 600 can be performed by software, firmware, hardware, or a combination thereof. Such operations are described with reference to the systems of FIGS. 1A-1B, 2-4, and FIGS. 5A-5B. However, such operations can be performed by other systems or components. For example, at least some of the operations of the flowcharts 600 are described as being performed by a computer at a surface of the wellbore. In some embodiments, one or more of these operations can be performed by a computer at the surface and/or downhole in the wellbore. The operations of the flowchart 600 start at block 602.

At block 602, a downhole tool (having a rotatable transmitter and a receiver array of at least two receivers physically positioned in different azimuthal directions) is conveyed into a production tubing positioned in a casing positioned around a wellbore such that there is an annular area (between the casing and a wall of the wellbore) into which a cement is placed. For example, with reference to FIG. 3, the acoustic logging tool 302 is lowered down the wellbore 301 within the production tubing 312. In some embodiments, the acoustic logging tool can include at least two receivers, wherein one of the receivers can be oriented in the same azimuthal direction as the transmitter, the unipole direction, and the other oriented 180° in the opposite direction. The difference between the two received acoustic responses can be considered a dipole acoustic response.

At block 604, the transmitter is rotated into position in a first azimuthal direction where the transmitter will emit an acoustic transmission outwards from the tool. For example, with reference to FIG. 3, the acoustic logging tool 302 is rotated in a direction of rotation 308 about its axis.

At block 606, the acoustic transmission is emitted in the first azimuthal direction (outward through the production tubing and the casing and into the cement) from the transmitter. For example, with reference to FIG. 3, the rotatable unipole transmitter 306 can emit an acoustic transmission at a current azimuthal position in the wellbore 301 outward toward through the production tubing 312 and the casing 316 and into the cement 318. In some embodiments, the transmitter can be a cross-dipole transmitter.

At block 608, acoustic responses generated from the emitted acoustic transmission are detected by the receiver array without rotation of the tool beyond a rotation threshold. For example, with reference to FIG. 3, the receivers of the receiver array 332 can detect an acoustic response generated from the acoustic transmission that passes through the production tubing 312 and the casing 316 and into the cement 318. The rotation threshold can be a minimum amount of rotation to allow for minor movement or rotation that can occur during operations but not intended to intentionally rotate the receiver array prior to detection. For example, the rotation threshold can be 2 degrees, 5, degrees, 10 degrees, etc. In some embodiments, the receiver(s) can be unipole receiver(s).

At block 610, a decomposed dipole response is generated based on the detected acoustic responses. For example, with reference to FIG. 2, the TTCE processor 248 can generate the decomposed dipole response based on the detected acoustic responses. In some embodiments, the TTCE processor 248 can compute the decomposed dipole response based on Equation (1):

$$S_{U\gamma}(\gamma = 0) = \frac{\sum_{i=1}^{M} S_{Ui}\cos[(\varphi_i)n]}{\sum_{i=1}^{M} (\cos\varphi_i)^2} \qquad (1)$$

where $S_{U\gamma}$ ($\gamma$=0) is the decomposed dipole response along the unipole direction, i.e., the azimuthal direction of the unipole transmitter. $S_{Ui}$ is an acoustic transmission in a U direction transmitted by the unipole transmitter and received by the "ith" azimuthal receiver of the array, i. Each acoustic transmission emitted by the transmitter can be calculated at an angle $\varphi_i$ for each receiver from i=1 to M total receivers in the array. In some implementations, a mode number of a standing wave, n, may take on values of either 0, 1, 2, or more, corresponding to monopole, dipole, quadrupole, and increasingly higher order multipole responses. For calculating a dipole response, n is equal to 1 in Equation (1). In other embodiments, n can vary depending on desired output responses. For example, decomposing a monopole, quadrupole and hexapole mode will use a value of n=0, 2 and 3 respectively. For decomposing higher order modes, larger values of n can be utilized in Equation (1). The selected value of n may be input into Equation (1), wherein the decomposed dipole response along the unipole direction will scale according to n. The decomposed dipole response along the unipole direction, $S_{U\gamma}$ ($\gamma$=0), incorporates an angle gamma ($\gamma$). Other embodiments may comprise a cross-dipole transmitter with the array of azimuthal receivers, wherein the angle gamma ($\gamma$) is used to represent an acoustic response at a "gamma" receiver (i.e., the acoustic response that would have been detected by a receiver in the "gamma" direction from the positive X-axis (0°), which can be in any azimuthal direction). While $\varphi_i$ refers to an explicit, known angle of a receiver in the array of azimuthal receivers, $\gamma$ can be any arbitrary angle for offset from any of the known angles of the i through M receivers. In some implementations in which the transmitter is a unipole rotatable transmitter, the angle gamma is 0°.

To help illustrate, referring back to FIG. 4, an example calculation can used to explain Equation (1) in further detail. The receiver angle $\varphi_{414}$ depicted in FIG. 4 can be input into Equation (1) to calculate the decomposed response in the direction of the receiver 414. In the azimuthal receiver array of FIG. 4, there can be a value of the receiver angle $\varphi_i$, corresponding to each of the 8 receivers 407-414 shown. In some embodiments, Equation (1) is used to calculate acoustic responses in the azimuthal directions of the receivers (i.e., with the angle gamma ($\gamma$) of zero). In some embodiments, Equation (1) considers the acoustic response at each receiver for each receiver in the array, not acoustic responses in azimuthal directions offset from the receivers.

The acoustic transmission emitted in the U direction and received by the "ith" azimuthal receiver, $S_{Ui}$, can be multiplied by an angular component comprising a cosine of the angle of the "ith" receiver, $\varphi_i$. The acoustic transmission can also be multiplied by the mode number of the standing wave, n. The cosine of the receiver angle, $\varphi_i$, can transform each acoustic transmission to the direction of each i receiver of M receivers in the array. Referring to the numerator of Equation (1), each acoustic transmission $S_{Ui}$ is transformed to the cosine of the angle of the i receiver. Acoustic responses at each receiver can be summed from the first receiver in reference to the positive X-direction, portrayed by the receiver 411 in FIG. 4, to the M receiver, (e.g., the receiver 410, in reference to the positive X-direction moving in the counterclockwise direction). The denominator of Equation (1) is also a summation from receiver i=411 to M For each receiver, the cosine of the angle of the receiver, $\varphi_i$, is squared. The denominator of Equation (1) is included as a normalization factor. For example, if there are 8 receivers in the array of azimuthal receivers, the denominator will equal 4. If there are 6 receivers in the array of azimuthal receivers, the denominator will equal 3. Thus, the decomposed dipole response along the unipole direction can be calculated based on Equation (1), comprising acoustic responses in each azimuthal receiver direction as the tool rotates within the borehole.

At block 612, the decomposed dipole response is computationally rotated based on a fluid channel direction. For example, with reference to FIG. 2, the TTCE processor 248 can perform this operation. In some embodiments, a fluid channel within the cement can be consider a fault in the cement. When a fluid channel is present in the cement, the cement is considered to be partially bonded. In some embodiments, the decomposed dipole response can be computationally rotated to a specific azimuthal direction (rotated such the X-axis is of the tool is at or near the center of the fluid channel) based on Equations (2)-(5):

$$S_{XX} = \frac{\sum_{i=1}^{N} S_{U\gamma}(\gamma = 0)\sin\phi_i}{N} \qquad (2)$$

-continued $$S_{YY} = \frac{\sum_{i=1}^{N} S_{U\gamma}(\gamma = 0)\sin(\phi_i + 90°)}{N} \quad (3)$$

$$S_{X'X'} = \frac{\sum_{i=1}^{N} S_{U\gamma}(\gamma = 0)\sin(\phi_i + \theta)}{N} \quad (4)$$

$$S_{Y'Y'} = \frac{\sum_{i=1}^{N} S_{U\gamma}(\gamma = 0)\sin(\phi_i + \theta + 90°)}{N} \quad (5)$$

Output from Equation (1), the decomposed dipole response, $S_{U\gamma}$ ($\gamma=0$), can be input into Equations (2)-(5). Equations (2) and (4) can be used to calculate the computational rotation for a rotatable unipole transmitter. Equations (3) and (5) can be used to calculate the computational rotation for a cross-dipole configuration with an X and Y dipole transmitter. For each firing of the unipole transmitter, the decomposed dipole response, $S_{U\gamma}$ ($\gamma=0$), can be transformed using a sine function of an angle of the rotatable unipole transmitter, $\phi_i$. This angle will change for each firing of the transmitter as the transmitter and acoustic logging tool rotate within the wellbore. $\phi_i$ is the firing direction with respect to the positive X direction; $\theta$ is the angle between X-Y coordinate and X'-Y' coordinate; and N is the number of firings in one or multiple revolutions of the transmitter within the wellbore.

The decomposed dipole response can be computationally rotated to rotated coordinates along the X'-Y' axes based on Equations (1), (2), and (4). For example, referring to FIGS. 5A-5B, FIG. 5A depicts the acoustic logging tool 509 having tool coordinates (X-Y) such that the tool coordinates are aligned at or near the center of the fluid channel 511. In FIG. 5B (unlike the example in FIG. 5A), the tool coordinates (X-Y) are not at or near the center of the fluid channel 515. Thus, the decomposed dipole response is to be computationally rotated to the rotated coordinates (X'-Y') such that the X' coordinate is at or near the center of the fluid channel 515. An angle of rotation, $\theta$, is the angle between the tool coordinates (X-Y) and the rotated coordinates (X'-Y'). The angle of rotation can be determined after acoustic transmission and detection of the acoustic response. This angle of rotation is incorporated into the Equations (2)-(5) where values of a computationally rotated decomposed dipole response, $S_{U\gamma}(\gamma=0)\sin(\phi_i+\theta)$, can be determined for each decomposed dipole response of an individual firing of the transmitter, $S_{U\gamma}(\gamma=0)$. The angle of rotation, $\theta$, can be used to offset the angle of the computationally rotated decomposed dipole response.

At block 614, a determination is made of whether there is another azimuthal position from which to emit an acoustic transmission. For example, with reference to FIG. 2, the TTCE processor 248 can make this determination. For instance, the TTCE operations may be configured such that emission and detection may be performed at N number of signal firings/emissions, each at a different azimuthal position. Accordingly, the TTCE processor 248 can determine whether an acoustic emission and detection has occurred at each of the of azimuthal positions over N firings of the transmitter. If there is another azimuthal position from which to emit an acoustic transmission, operations of the flowchart 600 continue at block 616. Otherwise, operations of the flowchart 600 continue to block 617.

At block 616, the downhole tool is rotated to a next azimuthal position for which to emit an acoustic transmission. For example, with reference to FIG. 2, the logging controller 250 can rotate the downhole tool. For example, with reference to FIG. 3, the acoustic logging tool 302 can rotate in a direction of rotation 308 to align with a next azimuthal position from which the transmitter will fire. Operations of the flowchart 600 then return to block 606.

At block 617, an overall dipole response projected to a specific azimuthal direction is computed based on a plurality of computationally rotated decomposed dipole responses. For example, with reference to FIG. 2, the TTCE processor 248 can perform this operation. Referring again to Equations (2) and (4), $S_{XX}$, is the overall dipole response of the operation based on the emissions at different azimuthal positions (emitted in the X-direction of the tool axis of FIG. 5A and received by the array of azimuthal receivers along the X-direction). This overall dipole response across acoustic transmissions in different azimuthal directions, based on the computationally rotated decomposed dipole responses of each firing of the transmitter, can be projected into specific azimuthal directions. For example, Equation (4) can be used to calculate a resulting overall dipole response projected to a specific azimuthal direction, $S_{X'X'}$.

Figure 7:
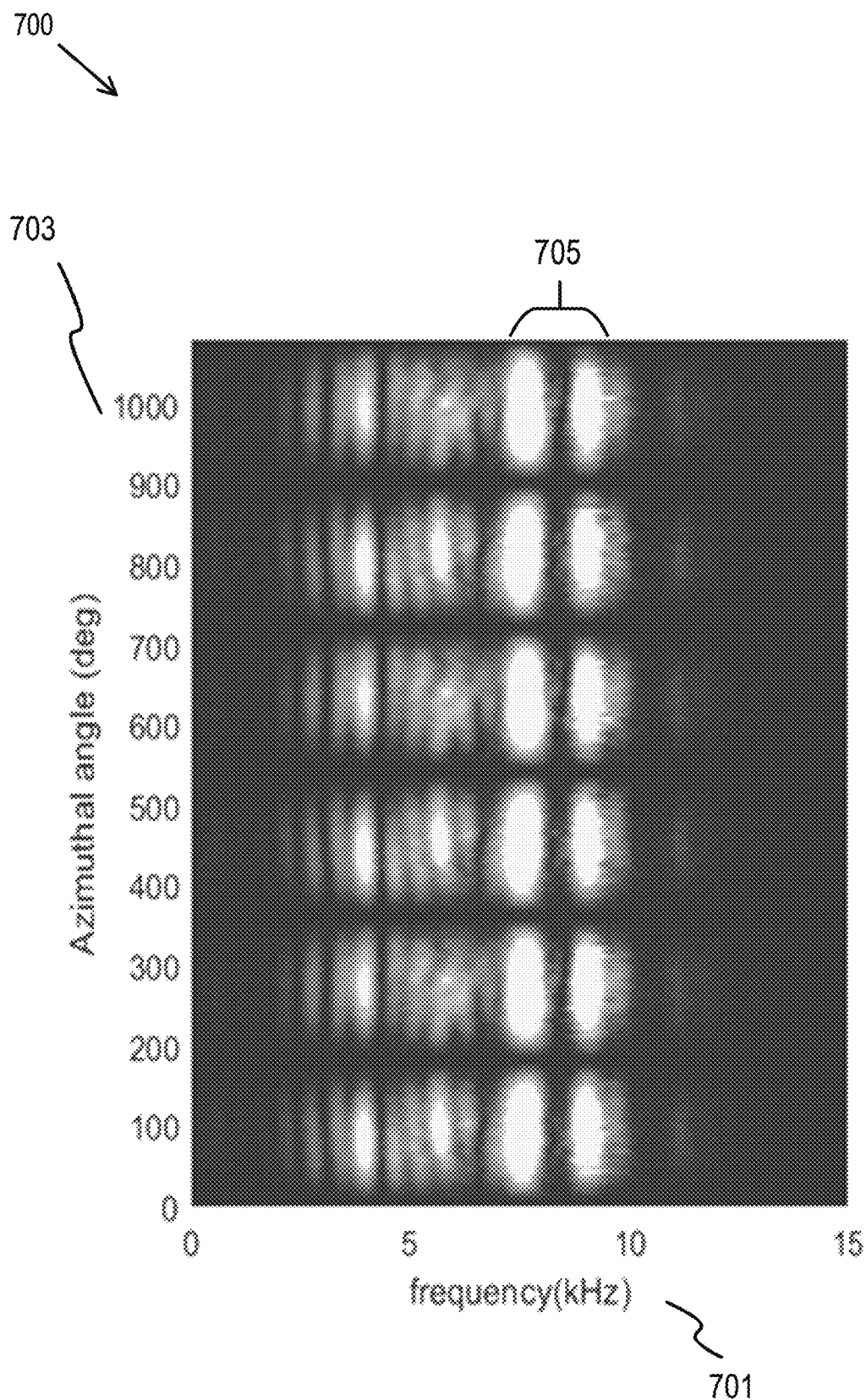
FIG. 7 depicts a graph of an example decomposed dipole response profile in a frequency domain across multiple revolutions of an acoustic logging tool, according to some embodiments.

To help illustrate, FIG. 7 depicts a graph of an example decomposed dipole response profile in a frequency domain across multiple revolutions of an acoustic logging tool, according to some embodiments. A graph 700 utilizes data from an example TTCE operation. In the example TTCE operation, the rotatable unipole transmitter fired 206 acoustic transmissions with an initial pulse at an angle $\phi_1$ at 0°. The tool rotates 5° counterclockwise between firings, a third acoustic transmission is emitted at an angle $\phi_3$ of 10°. When calculating a decomposed dipole response in the unipole direction of the third firing and further computationally rotating the response, for example, the processor can computationally rotate $S_{U\gamma}$ ($\gamma=0$) as the product of $S_{U\gamma}(\gamma=0)*\sin(10°+\theta)$, wherein the angle of rotation $\theta$ can be in any azimuthal direction. The above calculation is repeated for each firing wherein the angle of the transmitter, $\phi_i$, increases until the operation ceases. The computationally rotated decomposed dipole responses for each firing of the transmitter can be plotted to create a decomposed dipole response profile of the entire wellbore across one or multiple rotation intervals (revolutions) of the acoustic logging tool, as seen in FIG. 7. The processor utilizes Equation (4) to sum the computationally rotated decomposed dipole responses for each firing of the transmitter from i to N firings, wherein the sum of the computationally rotated decomposed dipole responses across N firings of the transmitter is divided by the total number of signal emissions, N The resultant quotient $S_{X'X'}$ corresponds to an overall dipole response across N firings of the rotatable unipole transmitter, computationally rotated to any azimuthal direction with the angle of rotation $\theta$. Thus, the processor can generate overall dipole responses corresponding to the angle of rotation for any azimuthal direction after completion of the TTCE operation. For example, with reference to FIG. 5B, the angle of rotation may correspond to a center of an offset fluid channel 515 within a cement layer 501 behind a casing 503.

The acoustic logging tool 302 of FIG. 3 may complete multiple intervals of azimuthal rotation (revolutions) in the wellbore when emitting acoustic transmissions in various azimuthal directions. In FIG. 7, the graph 700 includes a y-axis 703 that is an azimuthal angle of a response and an x-axis 701 that is frequency in kilohertz (kHz). The y-axis 703 extends to ~1,100°, meaning the graph 700 shows 3 revolutions of the downhole logging tool. Each separation of the responses, seen 180° apart from one another, shows a minimum value of acoustic responses with large responses in orthogonal directions, characteristic of dipoles. Each division at 360° marks the start of a new rotation interval of the logging tool. The graph 700 models decomposed dipole responses in a frequency domain for unipole transmitter firings. A bracket 705 illustrates a region of the graph 700 where decomposed dipole responses, both in the directions of the receivers and in computationally rotated directions, are strongest, i.e., of a higher amplitude. Since the processor can rotate responses in any azimuthal direction, a continuous profile of decomposed dipole responses is created in the graph 700. The number of acoustic transmission emissions/firings from the rotatable transmitter can be increased to further improve data granularity when detecting acoustic responses, hence improving a signal to noise ratio.

Figure 8:
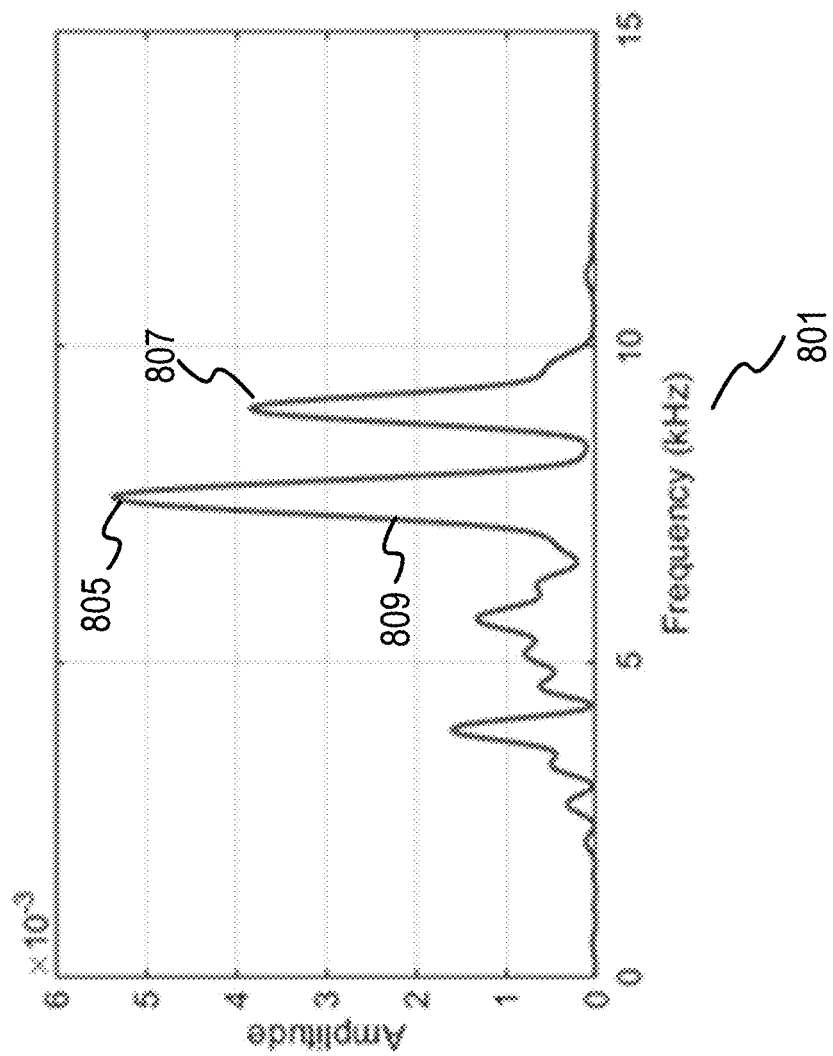
FIG. 8 depicts a graph of an example overall dipole response profile based on the decomposed dipole response profile of FIG. 7, according to some embodiments.

FIG. 8 depicts a graph of an example overall dipole response profile based on the decomposed dipole response profile of FIG. 7, according to some embodiments. Whereas FIG. 7 illustrates individual firings of N firings across a profile of decomposed dipole responses, FIG. 8 models the overall dipole response of the example TTCE operation, i.e., the mean of FIG. 7. FIG. 8 includes an x-axis 801 that is a frequency of the overall dipole response in kilohertz (kHz), a y-axis 803 that is an amplitude of the overall dipole response, and a curve 809 that models the relationship of response amplitude at various frequencies. At ~7 kHz and ~9 kHz on the x-axis 801, amplitudes of the overall dipole response peak twice at amplitude peaks 805 and 807, corresponding to multiple dipole modes. The higher amplitude dipole responses are caused by acoustic signals "ringing" in the wellbore due to weak cement bond integrity to the casing. The amplitude peaks 805 and 807 on the graph 800 can be correlated to the bracketed region 705 of strong dipole responses of graph 700, wherein responses of the bracketed region 705 of strong dipole responses were also received and/or calculated at computationally rotated azimuthal directions within frequencies near ~7 kHz and ~9 kHz. By correlating with the y-axis 703 on graph 700, dipole response behavior at any specific azimuthal angle can be modeled by the processor and visualized by an operator/user.

At block 618, evaluation of a cement bonding condition based on an overall dipole response projected to a specific azimuthal direction is performed. For example, with reference to FIG. 2, the TTCE processor 248 can perform this cement bonding evaluation. The overall dipole response projected to a specific azimuthal direction, which is also rotated computationally, can be used to evaluate the cement bonding condition. A strong dipole response in FIG. 8, denoted by high amplitude signatures, can be correlated to FIG. 7 to determine at which azimuthal angles the cement bonding to the casing is weak. The cement may comprise fluid channels or be partially bonded to the casing, which can be considered a fault in the cement.

When acoustic signals contact a casing that is sufficiently bonded to a cement layer (no fluid channels, cracks, or pockets in the cement), the cement layer dampens the amplitude of each acoustic response when it is received by the receiver array. If there is an absence of cement behind the casing or the cement has bonded to the casing poorly, then the acoustic signals will "ring" louder as they travel to the receiver array. The received acoustic responses indicative of poor cement bonding are often of higher-amplitude since the cement cannot act as a dampener to attenuate the acoustic transmissions if not correctly bonded to the casing. Input properties such as wavelength, amplitude, and frequency can be used to plot both the azimuthal angle vs. frequency plot and an amplitude vs. frequency plot represented by FIGS. 7-8, respectively. The two graphs 700 and 800 can be used in tandem to identify the bonding condition of the cement, whether it is a fully bonded condition, a free pipe condition, or a partially bonded condition. For example, with reference to FIG. 7, the bracketed region 705 is indicative of a partial bonding condition. At the depth in which the acoustic logging tool conducted the TTCE operation, strong dipole response presence within the bracketed region 705 between frequencies ~7 kHz and ~9 kHz can be correlated to the amplitude peaks 805 and 807 of FIG. 8. FIG. 7 can then be used to identify which azimuthal angles correspond to the fault in the cement bonding condition.

For example, in some embodiments, responses of a given frequency that exceed a threshold amplitude can be indicative of a partial cement bonding. Alternatively, or in addition, a concentration of high-amplitude dipole responses of a given frequency at specific azimuthal directions can be indicative of a partial cement bonding. While example embodiments refer to operations for TTCE, example embodiments can be used in any other types of downhole applications and operations. For example, some embodiments can be used in drilling, wireline operations, etc. for evaluation of the subsurface formation. Accordingly, example embodiments (that include computationally rotated decomposed dipole responses) enable overcoming the imperfect dipole beam pattern inherent to dipole transmitters, the receiver imbalance experienced in cross-dipole transmitter configurations, and errors associated with physically rotating a logging tool downhole.

At block 620, a determination is made of whether a remedial action is needed based on the cement bonding condition evaluation. For example, with reference to FIG. 2, the TTCE processor 248 can make this determination. For instance, if the cement bonding condition evaluation identifies one or more fluid channels having a size greater than a threshold, the determination can be made that a remedial action is needed to correct these faults. If a remedial action is needed, operations of the flowchart 600 continue to block 622. Otherwise, operations of the flowchart 600 are complete.

At block 622, a remedial action based on the cement bonding condition evaluation is performed. For example, with reference to FIG. 2, the TTCE processor 248 can initiate such an operation. For instance, the TTCE processor 248 could initiate an operation to provide a remedial action to correct a fault (such as the cement bonding). An example of a remedial action can include different types of remedial cementing (such as squeeze cementing). Upon performing remedial action to correct cement bonding integrity discrepancies, operations of the flowchart 600 are complete.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a computer or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Other Example Applications

Figure 9A:
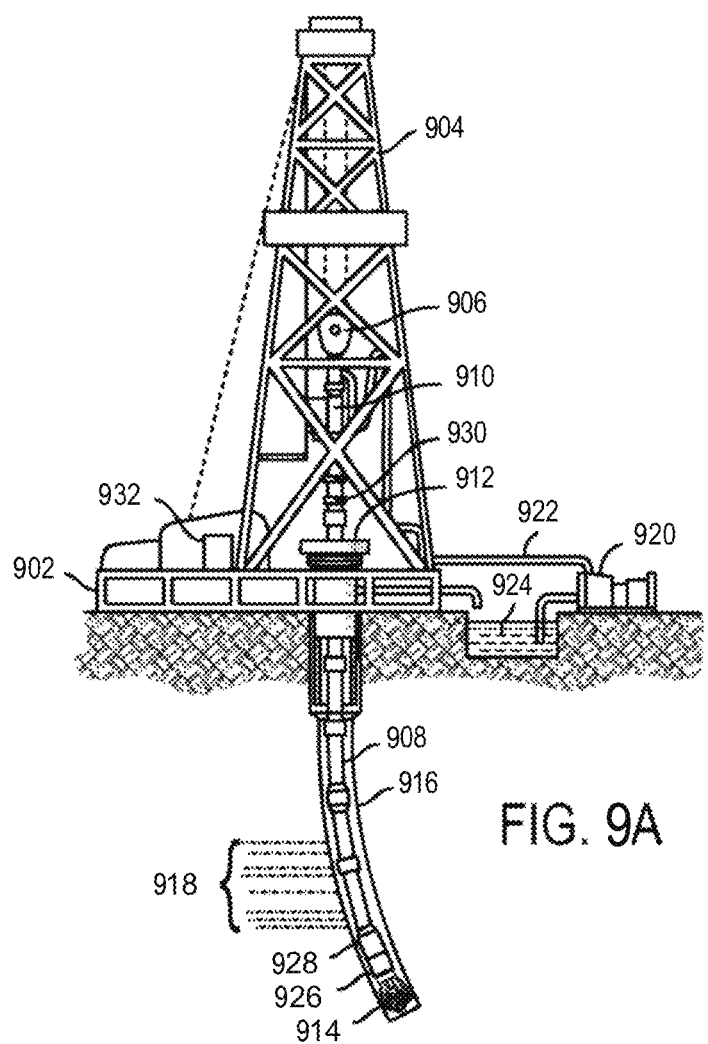
FIG. 9A depicts an example logging while drilling (LWD) system, according to some embodiments.

While described above in reference to a production application, some embodiments can be used in other downhole applications. For instance, two other example systems that can incorporate the transmitter and receiver configurations as described herein include logging while drilling (LWD) and wireline. FIG. 9A depicts an example logging while drilling (LWD) system, according to some embodiments. A drilling platform 902 supports a derrick 904 having a traveling block 906 for raising and lowering a drill string 908. A kelly 910 supports the drill string 908 as it is lowered through a rotary table 912. A drill bit 914 is driven by a downhole motor and/or rotation of the drill string 908. As the drill bit 914 rotates, it creates a wellbore 916 that passes through various formations 918. A pump 920 circulates drilling fluid through a feed pipe 922 to the kelly 910, downhole through the interior of the drill string 908, through orifices in the drill bit 914, back to the surface via the annulus around the drill string 908, and into a retention pit 924. The drilling fluid transports cuttings from the borehole into the retention pit 924 and aids in maintaining the borehole integrity.

An acoustic logging tool 926 can be integrated into the bottom-hole assembly near the drill bit 914. As the drill bit 914 extends the wellbore 916 through the formations 918, the bottom-hole assembly collects signal responses from signals emitted by a transmitter or series of transmitters disposed on the logging tool. The acoustic logging tool 926 may take the form of a drill collar (i.e., a thick-walled tubular that provides weight and rigidity to aid the drilling process). The acoustic logging tool 926 can also include one or more navigational packages for determining the position, inclination angle, horizontal angle, and rotational angle of the tool. Such navigational packages can include, for example, accelerometers, magnetometers, and/or sensors.

For purposes of communication, a downhole telemetry sub 928 can be included in the bottom-hole assembly to transfer measurement data to a surface receiver 930 and to receive commands from the surface. Mud pulse telemetry is one common telemetry technique for transferring tool measurements to surface receivers and receiving commands from the surface, but other telemetry techniques can also be used. In some embodiments, the telemetry sub 928 can store logging data for later retrieval at the surface when the logging assembly is recovered.

At the surface, the surface receiver 930 can receive the uplink signal from the downhole telemetry sub 928 and can communicate the signal to a data acquisition module 932. The data acquisition module 932 can include one or more processors, storage mediums, input devices, output devices, software, etc. The data acquisition module 932 can collect, store, and/or process the data received from the acoustic logging tool 926 to process signal responses which may aid in determining formation properties or wellbore characteristics. For example, the data collected by the data acquisition module 932 can be used to evaluate a formation porosity, formation anisotropy, cement integrity, and identify gas-comprising zones, among other uses.

Figure 9B:
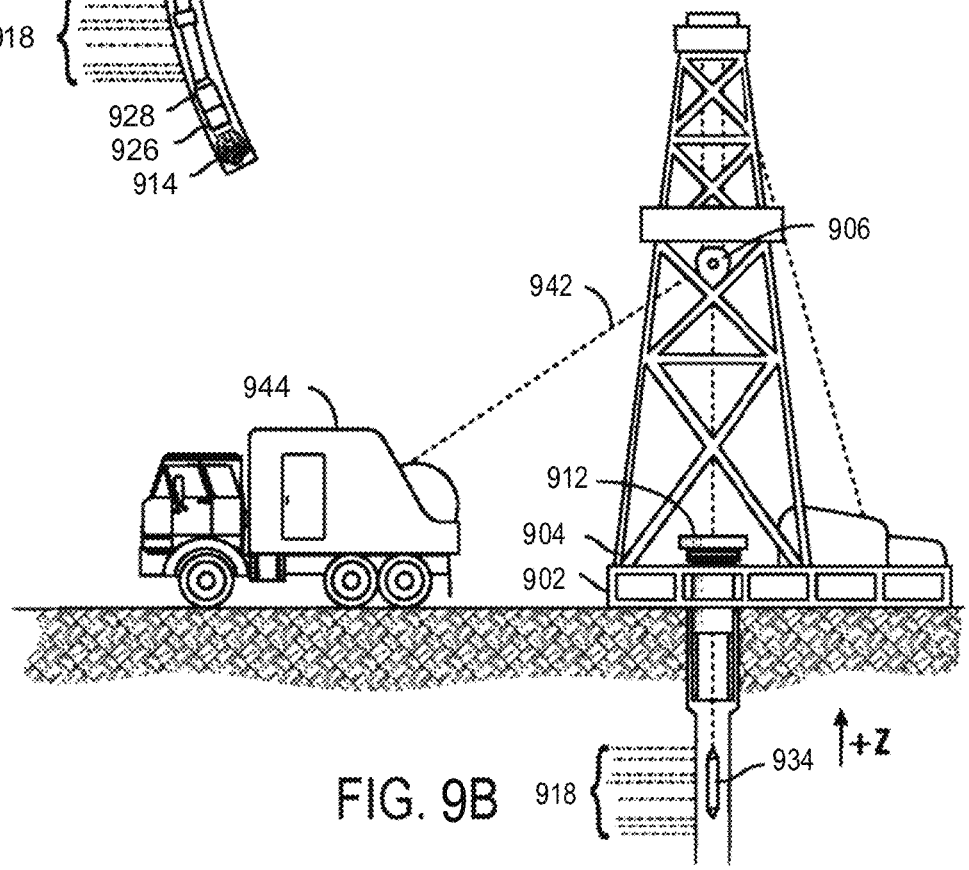
FIG. 9B depicts an example wireline system, according to some embodiments.

At various times during the drilling process, the drill string 908 may be removed from the borehole as shown in FIG. 9B. In particular, FIG. 9B depicts an example wireline system, according to some embodiments.

Once the drill string has been removed, logging operations can be conducted using a wireline logging tool 934 (i.e., a sensing instrument sonde suspended by a cable 942 having conductors for transporting power to the tool and telemetry from the tool to the surface). The wireline logging tool 934 may have pads and/or centralizing springs to maintain the tool near the central axis of the borehole or to bias the tool towards the borehole wall as the tool is moved downhole or uphole. The wireline logging tool 934 can also include one or more navigational packages for determining the position, inclination angle, horizontal angle, and rotational angle of the tool. Such navigational packages can include, for example, accelerometers, magnetometers, and/or sensors. In some embodiments, a surface measurement system (not shown) can be used to determine the depth of the wireline logging tool 934.

As explained further below, the wireline logging tool 934 can include an acoustic logging instrument that collects signal responses from a transmitter or transmitters on the acoustic logging tool that reveal information about properties of the formations 918 and the wellbore 916. A logging facility 944 includes a computer, such as those described further in FIG. 10, for collecting, storing, and/or processing the measurements gathered by the wireline logging tool 934 (e.g., to determine characteristics such as porosity, anisotropy, gas-comprising zones within the formations 918, and/or cement bonding integrity of the casing).

Although FIGS. 9A and 9B depict specific borehole configurations, it should be understood by those skilled in the art that the present disclosure is equally well suited for use in wellbores having other orientations including vertical wellbores, horizontal wellbores, slanted wellbores, multilateral wellbores, and the like. Also, even though FIGS. 9A and 9B depict an onshore operation, it should be understood by those skilled in the art that the present disclosure is equally well suited for use in offshore operations. Moreover, it should be understood by those skilled in the art that the present disclosure is not limited to the environments depicted in FIGS. 9A and 9B, and can also be used, for example, in other well operations such as non-conductive production tubing operations, jointed tubing operations, coiled tubing operations, combinations thereof, and the like.

Example Computer

Figure 10:
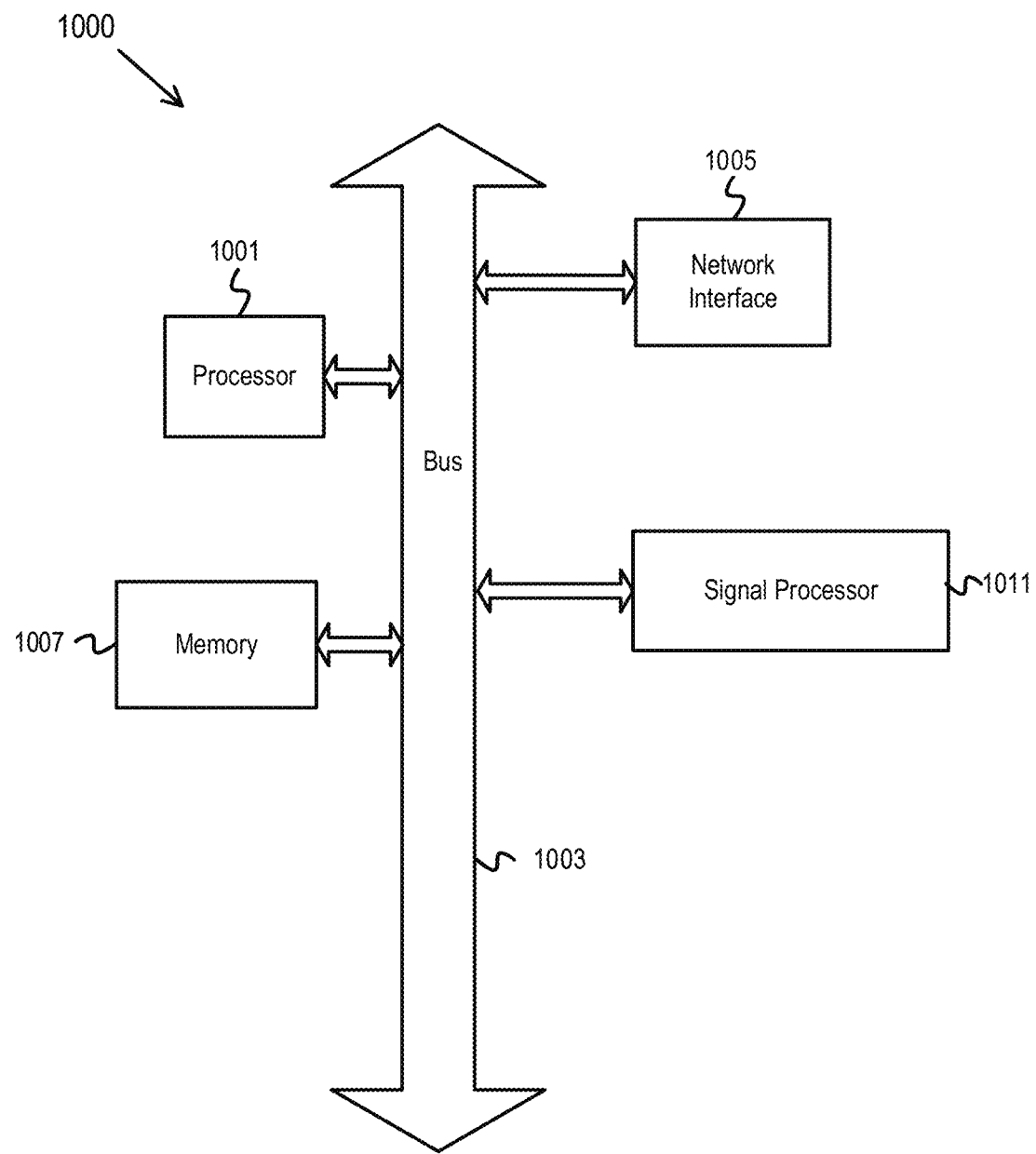
FIG. 10 depicts an example computer, according to some embodiments.

FIG. 10 depicts an example computer, according to some embodiments. A computer 1000 system includes a processor 1001 (possibly including multiple processors, multiple cores, multiple nodes, and/or implementing multi-threading, etc.). The computer 1000 includes a memory 1007. The memory 1007 may be system memory or any one or more of the above already described possible realizations of machine-readable media. The computer 900 also includes a bus 1003 and a network interface 1005. The computer 1000 can communicate via transmissions to and/or from remote devices via the network interface 1005 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1000 also includes a signal processor 1011. The signal processor 1011 can perform at least some of the operations described herein. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

While the aspects of the disclosure are described with reference to various implementations and exploitations, it will be understood that these aspects are illustrative and that the scope of the claims is not limited to them. In general, techniques for through tubing cement evaluation (TTCE) as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

EXAMPLE EMBODIMENTS

Embodiment #1: A method comprising: conveying a downhole tool in a tubing that is positioned in a casing that is positioned to form an annulus between the casing and a wall of a wellbore formed in a subsurface formation, the downhole tool having a rotatable transmitter and a receiver array that includes at least two receivers physically positioned in different azimuthal directions; performing the following until an acoustic transmission has been emitted for each of a number of defined azimuthal positions, rotating the rotatable transmitter to one of the number of defined azimuthal positions; emitting the acoustic transmission outward toward the subsurface formation; and detecting, by the receiver array and without rotation of the downhole tool beyond a rotation threshold, an acoustic response of a number of acoustic responses that is derived from the acoustic transmission; and computationally rotating, by a processor and after detecting, data of each of the number of acoustic responses in a pre-determined direction to generate a computationally rotated multipole response.

Embodiment #2: The method of Embodiment 1, wherein the computationally rotating comprises computationally rotating data of each of the number of acoustic responses in the pre-determined direction to generate the computationally rotated multipole response in a defined order based on a type of mode.

Embodiment #3: The method of any one of Embodiments 1-2, wherein computationally rotating the data of each of the number of acoustic responses comprises computationally rotating the data of each of the number of acoustic responses based on a direction of a fluid channel in a cement, wherein the cement is placed in the annulus.

Embodiment #4: The method of Embodiment 3, wherein computationally rotating the data of each of the number of acoustic responses based on the direction of the fluid channel comprises computationally rotating the data of each of the number of acoustic responses based on an azimuthal center of the fluid channel.

Embodiment #5: The method of Embodiment 4, further comprising: determining the azimuthal center of the fluid channel in the cement; determining whether a physical coordinate of physical coordinates of the physical position of the receiver array is at the azimuthal center of the fluid channel; in response to determining that the physical coordinate of the physical position of the receiver array is not at the azimuthal center of the fluid channel, determining rotated coordinates such that one of the rotated coordinates is at or near the azimuthal center of the fluid channel; and determining a difference in an azimuthal angle of the physical coordinates of the receiver array and an azimuthal angle of the rotated coordinates; and wherein computationally rotating the data of each of the number of acoustic responses comprises computationally rotating the data by the difference in the azimuthal angle of the physical coordinates of the receiver array and the azimuthal angle of the rotated coordinates.

Embodiment #6: The method of any one of Embodiments 1-5, wherein the rotatable transmitter comprises a unipole transmitter.

Embodiment #7: The method of any one of Embodiments 1-6, further comprising: evaluating a property of a cement placed in the annulus based on the computationally rotated response.

Embodiment #8: The method of Embodiment 7, wherein evaluating the property of the cement comprises evaluating a bonding condition of the cement, wherein the bonding condition of the cement is at least one of a fully bonded condition, a free pipe condition, and a partially bonded condition.

Embodiment #9: The method of any one of Embodiments 7-8, further comprising performing a remedial action to correct a fault in the cement based on the evaluating the property of the cement.

Embodiment #10: A system comprising: a downhole tool to be conveyed in a tubing that is positioned in a casing that is positioned to form an annulus between the casing and a wall of a wellbore formed in a subsurface formation, the downhole tool comprising, an acoustic transmitter, wherein, after the downhole tool is conveyed in the wellbore, the downhole tool is to rotate such that the acoustic transmitter is to emit an acoustic transmission outward toward the subsurface formation in a first azimuthal direction; and at least two acoustic receivers as part of a receiver array to detect, without rotation of the downhole tool beyond a rotation threshold, an acoustic response that is derived from the acoustic transmission; a processor; and a machine-readable medium having program code executable by the processor to cause the processor to, computationally rotate, after detection, data of the acoustic response in a pre-determined direction to generate a computationally rotated response.

Embodiment #11: The system of Embodiment 10, wherein the acoustic transmitter is a rotatable unipole transmitter.

Embodiment #12: The system of any one of Embodiments 10-11, wherein the acoustic transmitter is a cross-dipole transmitter.

Embodiment #13: The system of any one of Embodiments 10-12, wherein the program code executable by the processor to cause the processor to computationally rotate, after detection, the data of the acoustic response in the pre-determined direction to generate the computationally rotated response comprises program code executable by the processor to cause the processor to computationally rotate the data of the acoustic response based on a direction of a fluid channel in a cement, wherein the cement is placed in the annulus.

Embodiment #14: The system of Embodiment 13, wherein the program code executable by the processor to cause the processor to computationally rotate the data of the acoustic response based on the direction of the fluid channel in the cement further comprises program code executable by the processor to cause the processor to evaluate a condition of a cement bonding of the cement to the casing based on the computationally rotated response.

Embodiment #15: The system of Embodiment 14, wherein the program code executable by the processor to cause the processor to evaluate the condition of the cement bonding of the cement to the casing based on the computationally rotated response further comprises program code executable by the processor to cause the processor to determine whether the condition of the cement bonding of the cement to the casing is at least one of a fully bonded condition, a free pipe condition, and a partially bonded condition.

Embodiment #16: The system of any one of Embodiments 14-15, wherein the program code executable by the processor to cause the processor to evaluate the condition of the cement bonding of the cement to the casing based on the computationally rotated response further comprises program code executable by the processor to cause the processor to perform a remedial action to correct a fault in the cement based on the condition of the cement bonding of the cement to the casing.

Embodiment #17: One or more non-transitory machine-readable media comprising program code executable by a processor to cause the processor to, for each of a number of azimuthal positions: detect, by a receiver array and without rotation of a downhole tool beyond a rotation threshold, an acoustic response of a number of acoustic responses that is derived from an acoustic transmission, wherein the downhole tool is conveyed in a tubing that is positioned in a casing that is positioned to form an annulus between the casing and a wall of a wellbore formed in a subsurface formation; and computationally rotate, by the processor and after detection, data of each of the number of acoustic responses in a pre-determined direction to generate a computationally rotated response.

Embodiment #18: The one or more non-transitory machine-readable media of Embodiment 17, wherein the program code comprises program code executable by the processor to cause the processor to: determine an azimuthal center of a fluid channel in a cement, wherein the cement is placed in the annulus; determine whether a physical coordinate of physical coordinates of the physical position of the receiver array is at the azimuthal center of the fluid channel; in response to determining that the physical coordinate of the physical position of the receiver array is not at the azimuthal center of the fluid channel, determine rotated coordinates such that one of the rotated coordinates is at or near the azimuthal center of the fluid channel; and determine a difference in an azimuthal angle of the physical coordinates of the receiver array and an azimuthal angle of the rotated coordinates; and wherein the program code to computationally rotate the data of each of the number of acoustic responses comprises program code to computationally rotate the data by the difference in the azimuthal angle of the physical coordinates of the receiver array and the azimuthal angle of the rotated coordinates.

Embodiment #19: The one or more non-transitory machine-readable media of any one of Embodiments 17-18, wherein the program code executable by the processor to cause the processor to generate the computationally rotated response comprises program code executable by the processor to cause the processor to evaluate a property of a cement placed in the annulus based on the computationally rotated response.

Embodiment #20: The one or more non-transitory machine-readable media of Embodiment 19, wherein the program code executable by the processor to cause the processor to evaluate the property of the cement placed in the annulus based on the computationally rotated response comprises program code executable by the processor to cause the processor to evaluate a bonding condition of the cement.

What is claimed is:

1. A method comprising:
conveying a downhole tool in a tubing that is positioned in a casing that is positioned to form an annulus between the casing and a wall of a wellbore formed in a subsurface formation, the downhole tool having a rotatable transmitter and a receiver array that includes at least two receivers physically positioned in different azimuthal directions;
performing the following until an acoustic transmission has been emitted for each of a number of defined azimuthal positions,
rotating the rotatable transmitter to one of the number of defined azimuthal positions;
emitting the acoustic transmission outward toward the subsurface formation; and
detecting, by the receiver array and without rotation of the downhole tool beyond a rotation threshold, an acoustic response of a number of acoustic responses that is derived from the acoustic transmission; and
computationally rotating, by a processor and after detecting, data of each of the number of acoustic responses in a pre-determined direction to generate a computationally rotated multipole response.

2. The method of claim 1, wherein the computationally rotating comprises computationally rotating data of each of the number of acoustic responses in the pre-determined direction to generate the computationally rotated multipole response in a defined order based on a type of mode.

3. The method of claim 1, wherein computationally rotating the data of each of the number of acoustic responses comprises computationally rotating the data of each of the number of acoustic responses based on a direction of a fluid channel in a cement, wherein the cement is placed in the annulus.

4. The method of claim 3, wherein computationally rotating the data of each of the number of acoustic responses based on the direction of the fluid channel comprises computationally rotating the data of each of the number of acoustic responses based on an azimuthal center of the fluid channel.

5. The method of claim 4, further comprising:
determining the azimuthal center of the fluid channel in the cement;
determining whether a physical coordinate of physical coordinates of the physical position of the receiver array is at the azimuthal center of the fluid channel;
in response to determining that the physical coordinate of the physical position of the receiver array is not at the azimuthal center of the fluid channel,
determining rotated coordinates such that one of the rotated coordinates is at or near the azimuthal center of the fluid channel; and
determining a difference in an azimuthal angle of the physical coordinates of the receiver array and an azimuthal angle of the rotated coordinates; and
wherein computationally rotating the data of each of the number of acoustic responses comprises computationally rotating the data by the difference in the azimuthal angle of the physical coordinates of the receiver array and the azimuthal angle of the rotated coordinates.

6. The method of claim 1, wherein the rotatable transmitter comprises a unipole transmitter.

7. The method of claim 1, further comprising:
evaluating a property of a cement placed in the annulus based on the computationally rotated response.

8. The method of claim 7, wherein evaluating the property of the cement comprises evaluating a bonding condition of the cement, wherein the bonding condition of the cement is at least one of a fully bonded condition, a free pipe condition, and a partially bonded condition.

9. The method of claim 7, further comprising performing a remedial action to correct a fault in the cement based on the evaluating the property of the cement.

10. A system comprising:
a downhole tool to be conveyed in a tubing that is positioned in a casing that is positioned to form an annulus between the casing and a wall of a wellbore formed in a subsurface formation, the downhole tool comprising,
an acoustic transmitter, wherein, after the downhole tool is conveyed in the wellbore, the downhole tool is to rotate such that the acoustic transmitter is to emit an acoustic transmission outward toward the subsurface formation in a first azimuthal direction; and
at least two acoustic receivers as part of a receiver array to detect, without rotation of the downhole tool beyond a rotation threshold, an acoustic response that is derived from the acoustic transmission;
a processor; and
a machine-readable medium having program code executable by the processor to cause the processor to,
computationally rotate, after detection, data of the acoustic response in a pre-determined direction to generate a computationally rotated response.

11. The system of claim 10, wherein the acoustic transmitter is a rotatable unipole transmitter.

12. The system of claim 10, wherein the acoustic transmitter is a cross-dipole transmitter.

13. The system of claim 10, wherein the program code executable by the processor to cause the processor to computationally rotate, after detection, the data of the acoustic response in the pre-determined direction to generate the computationally rotated response comprises program code executable by the processor to cause the processor to computationally rotate the data of the acoustic response based on a direction of a fluid channel in a cement, wherein the cement is placed in the annulus.

14. The system of claim 13, wherein the program code executable by the processor to cause the processor to computationally rotate the data of the acoustic response based on the direction of the fluid channel in the cement further comprises program code executable by the processor to cause the processor to evaluate a condition of a cement bonding of the cement to the casing based on the computationally rotated response.

15. The system of claim 14, wherein the program code executable by the processor to cause the processor to evaluate the condition of the cement bonding of the cement to the casing based on the computationally rotated response further comprises program code executable by the processor to cause the processor to determine whether the condition of the cement bonding of the cement to the casing is at least one of a fully bonded condition, a free pipe condition, and a partially bonded condition.

16. The system of claim 14, wherein the program code executable by the processor to cause the processor to evaluate the condition of the cement bonding of the cement to the casing based on the computationally rotated response further comprises program code executable by the processor to cause the processor to perform a remedial action to correct a fault in the cement based on the condition of the cement bonding of the cement to the casing.

17. One or more non-transitory machine-readable media comprising program code executable by a processor to cause the processor to, for each of a number of azimuthal positions:
   detect, by a receiver array and without rotation of a downhole tool beyond a rotation threshold, an acoustic response of a number of acoustic responses that is derived from an acoustic transmission, wherein the downhole tool is conveyed in a tubing that is positioned in a casing that is positioned to form an annulus between the casing and a wall of a wellbore formed in a subsurface formation; and
   computationally rotate, by the processor and after detection, data of each of the number of acoustic responses in a pre-determined direction to generate a computationally rotated response.

18. The one or more non-transitory machine-readable media of claim 17, wherein the program code comprises program code executable by the processor to cause the processor to:
   determine an azimuthal center of a fluid channel in a cement, wherein the cement is placed in the annulus;
   determine whether a physical coordinate of physical coordinates of the physical position of the receiver array is at the azimuthal center of the fluid channel;
   in response to determining that the physical coordinate of the physical position of the receiver array is not at the azimuthal center of the fluid channel,
   determine rotated coordinates such that one of the rotated coordinates is at or near the azimuthal center of the fluid channel; and
   determine a difference in an azimuthal angle of the physical coordinates of the receiver array and an azimuthal angle of the rotated coordinates; and
   wherein the program code to computationally rotate the data of each of the number of acoustic responses comprises program code to computationally rotate the data by the difference in the azimuthal angle of the physical coordinates of the receiver array and the azimuthal angle of the rotated coordinates.

19. The one or more non-transitory machine-readable media of claim 17, wherein the program code executable by the processor to cause the processor to generate the computationally rotated response comprises program code executable by the processor to cause the processor to evaluate a property of a cement placed in the annulus based on the computationally rotated response.

20. The one or more non-transitory machine-readable media of claim 19, wherein the program code executable by the processor to cause the processor to evaluate the property of the cement placed in the annulus based on the computationally rotated response comprises program code executable by the processor to cause the processor to evaluate a bonding condition of the cement.

* * * * *